United States Patent
Taniguchi et al.

[11] Patent Number: 5,860,359
[45] Date of Patent: Jan. 19, 1999

[54] GAS-PERMSELECTIVE GAS PUMP AND WARMER FOR USING SAME

[75] Inventors: Noboru Taniguchi, Osaka; Takaharu Gamou, Fujiidera; Yasuhito Takahashi, Hirakata; Kunihito Mori, Toyonaka; Eiichi Yasumoto, Katano, all of Japan

[73] Assignee: Matsushita Electric Industrial Co., Ltd., Osaka-fu, Japan

[21] Appl. No.: 737,468

[22] PCT Filed: Mar. 18, 1996

[86] PCT No.: PCT/JP96/00718

§ 371 Date: Feb. 7, 1997

§ 102(e) Date: Feb. 7, 1997

[87] PCT Pub. No.: WO96/28589

PCT Pub. Date: Sep. 19, 1996

[30] Foreign Application Priority Data

Mar. 16, 1995 [JP] Japan ................... 7-057210
May 24, 1995 [JP] Japan ................... 7-124671
Sep. 21, 1995 [JP] Japan ................... 7-242860

[51] Int. Cl.⁶ .............. A23L 1/00; A47J 27/00; A47J 27/04; F27D 11/02
[52] U.S. Cl. ................. 99/451; 99/331; 99/333; 99/340; 99/358; 99/403; 99/468; 99/473; 99/483
[58] Field of Search ............ 99/339, 340, 326–333, 99/358, 403, 451, 467, 468, 473–476, 483; 219/435, 441, 492, 494, 506

[56] References Cited

U.S. PATENT DOCUMENTS

| | | | |
|---|---|---|---|
| 4,426,923 | 1/1984 | Ohata ........................... | 99/468 |
| 4,431,906 | 2/1984 | Oota et al. .................... | 219/441 |
| 4,438,324 | 3/1984 | Narita et al. .................. | 219/494 X |
| 4,441,016 | 4/1984 | Oota et al. .................... | 99/333 X |
| 4,455,480 | 6/1984 | Matsumoto et al. .......... | 99/325 X |
| 4,463,249 | 7/1984 | Narita et al. .................. | 219/492 X |
| 4,672,179 | 6/1987 | Onishi et al. .................. | 99/403 X |
| 4,674,890 | 6/1987 | Kojima et al. ................. | 99/327 |
| 4,687,910 | 8/1987 | Aoshima et al. .............. | 99/342 |
| 4,853,509 | 8/1989 | Murakami ..................... | 99/451 |
| 4,952,765 | 8/1990 | Toyosawa ...................... | 99/410 X |
| 5,031,519 | 7/1991 | Toida et al. ................... | 99/340 |
| 5,156,082 | 10/1992 | Fukuda et al. ............... | 99/403 X |
| 5,293,814 | 3/1994 | Vorwerck et al. . | |
| 5,404,803 | 4/1995 | Glucksman . | |

FOREIGN PATENT DOCUMENTS

| | | |
|---|---|---|
| 55-84117 | 6/1980 | Japan . |
| 55-136101 | 10/1980 | Japan . |
| 56-129602 | 10/1981 | Japan . |
| 56-134502 | 10/1981 | Japan . |
| 57-55109 | 4/1982 | Japan . |
| 57-188218 | 11/1982 | Japan . |
| 58-12625 | 1/1983 | Japan . |
| 60-118171 | 6/1985 | Japan . |
| 60-149348 | 8/1985 | Japan . |
| 2-99966 | 8/1990 | Japan . |
| 5-56844 | 3/1993 | Japan . |
| 5-154039 | 6/1993 | Japan . |
| 5-254803 | 10/1993 | Japan . |

Primary Examiner—Timothy F. Simone
Attorney, Agent, or Firm—Wenderoth, Lind & Ponack, L.L.P.

[57] ABSTRACT

A face shaped molding body of first electrode/solid electrolyte/second electrode composed of first and second electrodes on both the faces of the sold electrolyte layer is adapted to impress DC valve between the first electrode and second electrode in a condition where the solid electrolyte layer is heated to a given operation temperature. Atmosphere poor in oxygen or atmosphere rich in oxygen can be formed, by a gas pump which is selectively capable of discharging or feeding at least oxygen gas from the first atmosphere to the second atmosphere, so that atmosphere suitable for food preservation can be retained or chamber wherein oxygen is likely to be poor at heating can be retained in a condition rich in oxygen. Also, oxygen gas can be exchanged for steam when necessary so that the exchange ratio can be controlled by the controlling of the electrolysis voltage. Further, atmosphere is likely to be controlled, because the transportation amount of the oxygen gas and steam can be weighed by the current amount.

56 Claims, 19 Drawing Sheets

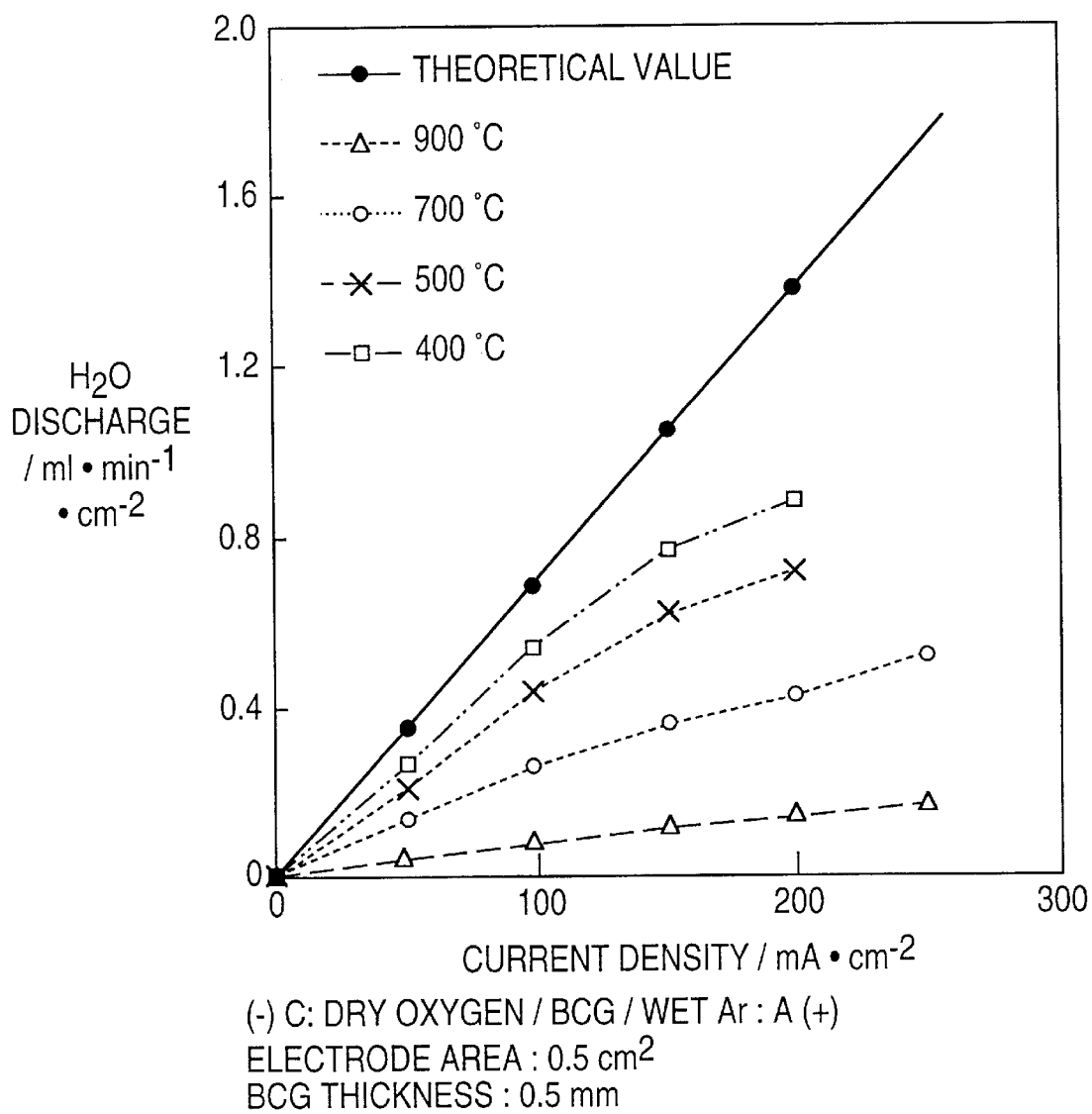

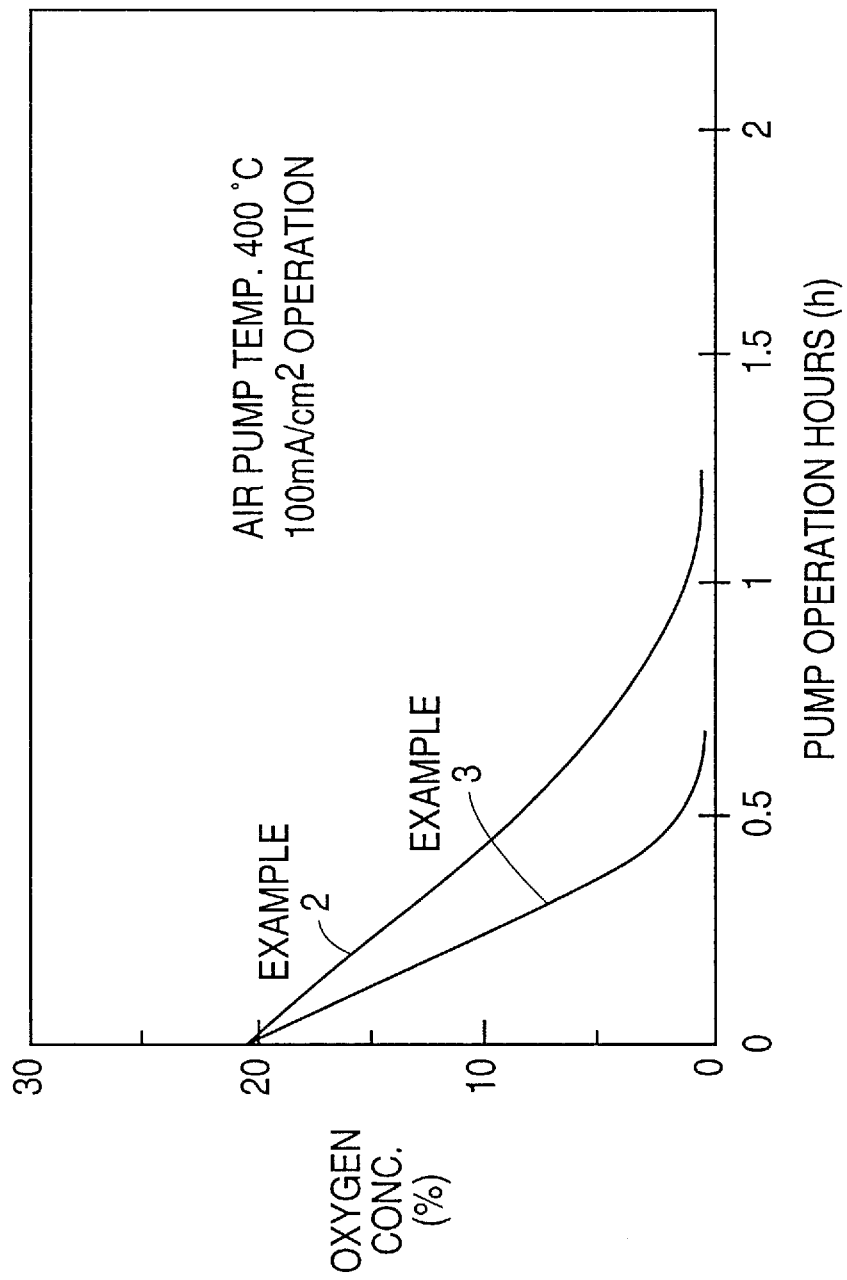

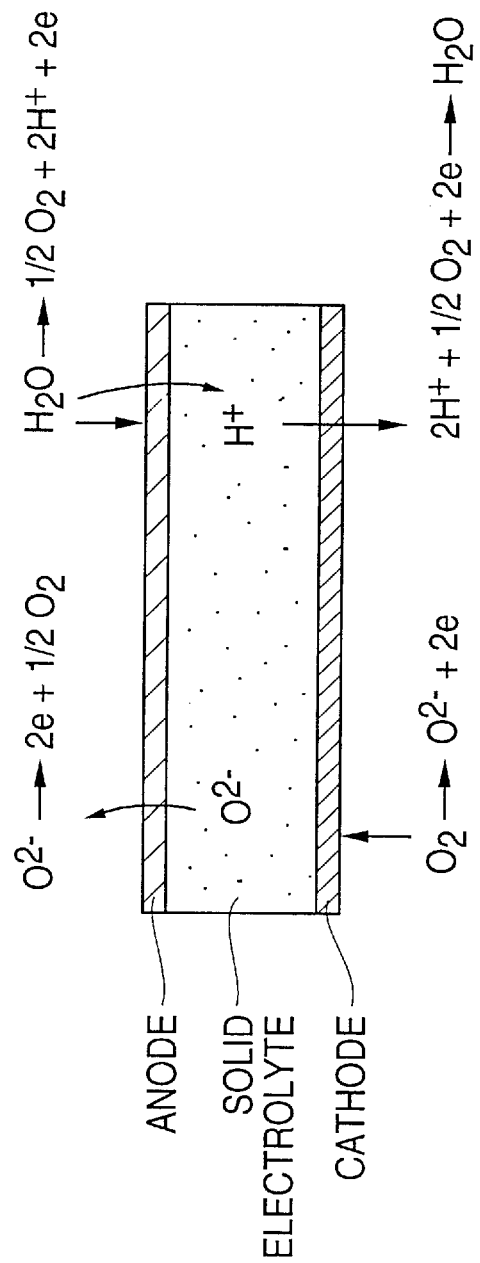

GAS-PERMSELECTIVE GAS PUMP AND WARMER FOR USING SAME

BACKGROUND OF THE INVENTION

It is generally difficult, although desirable, to provide an apparatus for selectively control oxygen concentration and steam in the atmosphere gas within a food preserving container, indoors or the like. There remains room undeveloped as a method of keeping boiled rice although the art of cooking the rice is considerably improved. For example, the rice cooker for cooking the rice and keeping it warm is developed in recent years in rice cooking•warming mechanism applying Neuro Fuzzy theory so that rice can be cooked as tasty as possible and thereafter, the cooked rice can be kept in a tasty condition. The rice can be cooked tasty, kept tasty by the warming pot by the application of the induction heater (I·H). The cooked rice enters into a warmth keeping condition. Thereafter, the cooked rice is taken cut after the cover has been opened, and the remaining rice is retained again in a warm keeping condition. When the cooked rice is taken out after several hours, the rice becomes often yellow in tint, causing the unplesant smells. The cooked rice becomes untasty because of oxidization caused in it although in the keeping condition.

A direct oxidizing prevention of the cooked rice is not realized although a method of keeping the cooked rice in a condition as good as possible by the adjustment of the warmth keeping temperature is considered. A means for removing the oxygen of the warmth keeping pot is proposed in Japanese Patent Application (unexamined) No. 5-154039 as shown in FIG. 9 wherein 1 denotes an rice boiler, 32 a lid, 33 an inner pot, 34 an angle, 35 a heater, 38 an inner lid, 39 an intake pipe, 40 an opening, 41 a valve, 42 a separating film, 43 an opening and 44 a vacuum device. The means is composed of gas separating films through which only oxygen is transmitted, and a pressure reducing apparatus (mechanical pump). A method of discharging the oxygen existing within the warmer pot out of the warmer is proposed. However, the rice cooker proposed above has the following problems. A valve apparatus, gas separating films, a pressure reducing apparatus are provided within the cover body, resulting in bigger cover body, increasing the weight thereof, thus interfering with the opening, closing operations of the cover body. There are problems such as performance deterioration due to dewing on the gas separating films, the operation noises of the pressure reducing apparatus and so on. Further, it is difficult to put the apparatuses into practical use without provision of a means for taking measures with respect to the pressure reducing condition in the case of the oxygen discharging. Also, although an oxygen pump using a perovskite type of oxide is proposed in Japanese Laid-Open Patent Application Tokkaisho No. 56-134502, a system to be driven by optical application is not much practical.

SUMMARY OF THE INVENTION

A first object of the present invention is to provide a gas-permselective gas pump which selectively transmits oxygen gas in an atmosphere containing several kinds of gas to control the oxygen gas concentration, if necessary, oxygen gas and steam in the atmosphere to control the oxygen and the steam concentration in the atmosphere.

The inventors have found, after serious researches that oxide ions ($O^{2-}$) are selectively permeated to one side of the solid electrolyte (the anode side) from the other side (the cathode side) through the solid electrolyte, while protons ($H^+$) are selectively permeated to the cathode side from the anode side through the solid electrolyte when the solid electrolyte is heated to a constant operating temperature. Therefore, we have found that the oxygen gas is electrolytically reduced on the cathode side by using a pair of electrodes placed on both sides of the solid electrolyte, the oxide ions produced are permeated from the anode to the cathode through the solid electrolyte, and thereafter, are oxidized on the anode side to return to the oxygen gas again. That is, as a result, the oxygen gas can be selectively discharged or supplied through the solid electrolyte from a first atmosphere to a second atmosphere.

The present invention is to provide a gas-permselective gas pump comprising the planar molded bodies of first electrode/solid electrolyte/second electrode for selectively pumping of gas, a power source for applying a DC voltage between the first electrode and the second electrode, a heating means for heating the solid electrolyte layer to a given operating temperature, wherein one of the first and second electrodes is provided as a cathode, and the other thereof as an anode, the oxygen gas in a first atmosphere which comes into contact at least on the cathode is electrolytically reduced by applying a DC voltage on both electrodes from the power source, to form the oxide ions, the oxide ions being transmitted onto the anode side through the solid electrolyte layer due to the potential difference between both the electrodes, finally the oxide ions transmitted being oxidized on the anode side to release the oxygen gas into the second atmosphere.

If the solid electrolyte has the proton conductivity and the oxide ion conductivity, a steam in the second atmosphere which comes into contact on the anode is electrolytically reduced with the DC voltage to be applied on both the electrodes from the power source to form protons, the protons being transmitted onto the cathode side through the solid electrolyte layer by the potential difference between both the electrodes, and the protons being reacted with oxygen to release a resultant steam into the first atmosphere.

A principle function of the gas pump according to the present invention is shown as in FIG. 21

Some contrivances are required to improve the operating performance of the gas pump. Firstly, the solid electrolyte may be formed into a planar shape over which entire surface each electrode can be formed. The gas diffusion property is desired to be used as the electrode.

To mold the first electrode/solid electrolyte/second electrode into the planar shape, there are two kinds of methods. One is to form the planar body on a support body having gas transmission, the first and second electrode layers being also designed not to prevent transmission of the oxide ions and protons to be formed there. The other is to form the support body from the solid electrolyte, with the first and second electrode layers built up on both the sides of the support body being formed not to prevent transmission of the oxide ions and protons to be formed there.

Secondly, electrolytic cells may be constructed of the built-up bodies composed of the first electrode layer/solid electrolyte layer/the second electrode layer in a manner that atmosphere gas including component gas to be electrolysed can be taken in effectively into the electrolyte.

Thirdly, the thickness of the solid electrolyte layer is made 1 mm or less.

The solid electrolyte may be selected from the group consisting of oxides having the oxide ion conduction such as perovskite type oxide including Ce, $ZrO_2$–$CaO$ oxide, $ThO_2$–$Y_2O_3$ oxide, $CeO_2$–$La_2O_3$ oxide, $Bi_2O_3$–$Y_2O_3$ oxide, $ZrO_2$–$Y_2O_3$ oxide, $ZrO_2$–$Yb_2O_3$ oxide, and $CeO_2$–$Gd_2O_3$–

MgO oxide. Among them, to selectively permeate the oxygen gas and the steam, a perovskite type oxide may be used as a mixed ion conductive body because of having the oxide ion and proton conductivity. The perovskite type oxide including Ce can be represented by the formula: $BaCe_{1-x}M_xO_{3-\alpha}$ wherein M is a substituted element selected from a group composed of La, Pr, Nd, Pm, Sm, Eu, Gd, Tb, Dy, Ho, Er, Tm, Yb, Y. Especially, the perovskite type oxide represented by the formula: $BaCe_{1-x}M_xO_{3-\alpha}$ (M is the above described substitution element, X is from 0.05 to 0.26) is preferred. Especially, the perovskite type oxide represented by the formula: $BaCe_{1-x}M_xO_{3-\alpha}$ (M is the above described substitution element, M is Gd) is more preferred. The disclosure of U.S. Pat. No. 5,387,330 can be used as reference for this type of solid electrolyte.

To manufacture the face shaped mounding body, there can be used 1) a method of having porous ceramics as the support body, applying platinum paste on the ceramics support body, thereafter baking it to form a first electrode layer, injecting in plasma solution the solid electrolyte onto the electrode layer to form the solid electrolyte layer, further applying platinum paste on the solid electrode layer, thereafter baking it to form the second electrode layer, 2) a method of applying platinum paste onto both the sides of the solid electrolyte molded body, thereafter baking it to form the first, and the second electrode layers. Accordingly, by the use of such a method, the electrolytic cell is constructed from the support body having gas transmission property to form a built-up body made of the first electrode layer/solid electrolyte layer/the second electrolyte layer on one side thereof to manufacture the gas pump of the present invention. Also, the electrolytic cell is made of the solid electrolyte, the first and second electrode layers are formed on both the opposite faces to form the built-up body made of the first electrode layer/solid electrolyte layer/the second electrode layer to manufacture the gas pump of the present invention. For example, the electrolytic cell can be made as a honey-comb construction body comprising many connection bodies or as a pipe-shaped body acting as gas transportation pipe.

The gas pump of the present invention may be operable by applying a voltage of 10 V or less, considering the endurability of the solid electrolyte, and a constant current may be supplied at a steam decomposition voltage or less which can be obtained from the experimental formula in order to control an oxygen permeation amount.

Steam decomposition voltage Ev=−0.001 T (solid electrolyte operation temperature: ° C.) +1.8

On the other hand, when the steam and oxygen exchange transport amount should be controlled, a constant current may be supplied at the following steam decomposition voltage of 10 V or less.

Steam decomposition voltage Ev=−0.001 T (solid electrolyte operation temperature: ° C.) +1.8

It is found out that there should be applied the constant voltage of 1.5 V or more between the first and second electrodes at 300° C. of the solid electrolyte heating temperature, and 1.0 V or more at 800° C. thereof to effect exchange transport between the steam and the oxygen.

The gas pump of the present invention involves a heating means, because the solid electrolyte is required to be heated to the operating temperature. The heating means may require the planar molded body to be covered with a heater through an insulating body, with the heater being covered with an adiabatic material.

A second object of the present invention is to provide a cooked-rice warmer which does not cause adhesion of the dew water and increase in the weight of the cover body to discharge the oxygen from the internal pot for preventing the yellow tint and unpleasant smells as much as possible during the warming operation by lowering of the oxygen concentration within the internal pot.

To achieve the above described object, the cooked-rice warmer of the present invention is provided with the gas pump as a means for discharging the oxygen stayed from the warmer in the rice warmer provided with a cover capable of be opened and closed, a container for accommodating the cooked rice, a means for heating the container to keep the cooked rice warm.

The warmer of such construction as described above keeps the rice warm accommodated within the internal pot with a heating element, and lowers the oxygen concentration within the internal pot by driving the oxygen pump composed of the solid electrolytes so as to prevent the rice from becoming yellow in tint and from causing the unpleasant smells during the warming operation. Therefore, the boiled rice can be warmed in a condition a little less than the cooked rice in spite of a longer time keeping operation.

The present invention realizes a superior rice warmer, because the deterioration of the rice such as yellow tint, different smells and so on through warming can be reduced by the provision of a means for discharging the gas from the warmer in the cooked-rice warmer having a cover capable of being opened and closed, a container for accommodating the cooked rice, and a means for heating the container to keep the rice warm.

Also, the oxygen pump is extremely durable with respect to the warmer to be used for longer hours and can be considerably reduced in cost, because no mechanical portions, no unpleasant sounds, no maintenance are provided due to discharging of the oxygen only existing within the warmer by the application of voltage upon the oxygen pump comprising solid electrolytes. Further, no differences in handling operations are made to the conventional warmers without hindrance, because the weight of the cover body is not increased too much. The characteristics can be remarkably improved, because many solid electrolytes of smaller area can be used to make the area larger.

A third object of the present invention is to provide the cooked-rice warmer with the gas pump as means for discharging, removing the oxygen within the warmer, or lowering the concentration of the oxygen, and for introducing the steam when necessary.

The summary of the present invention is characterized in that the solid electrolytes are made of ion conductor for conducting the oxide ions and protons. The objects can be achieved by discharging of the oxygen within the warmer through the solid electrolytes, and using the electrochemical pump for introducing the steam. Also, the objects can be achieved by using, desirably, BaCe-oxides which are higher in ion conduction and are chemically more stable.

An electrochemical gas pump using the solid electrolyte which conducts the oxide ions and protons has an ability to pump out the oxygen through the electrolytes, and simultaneously produces the steam as described in the following equation (FIG. 1).

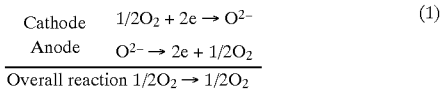

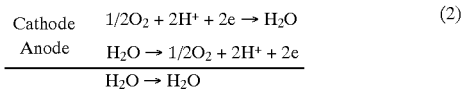

In the reaction (1), the oxygen is pumped out by the oxide ion conduction. In the reaction (2), the steam is pumped by the proton conduction. The proton conductor in the solid electrolyte allows the oxygen within the warmer to be substituted into the steam so that the inner pressure drop can be controlled. Further, the mixed ion conductor for simultaneously conducting the oxide ions allows the oxygen within the warmer to be discharged simultaneously with one solid electrolyte so that the efficiency of the removing the oxygen within the warmer becomes about 100% with respect to the making energization amount.

Also, the present invention proposes that the gas pump be larger in capacity, efficiency and functions. In order to improve the efficiency as much as possible as the construction of the electrochemical gas pump, it is necessary to shorten the distance of the current path of the solid electrolyte itself and to enlarge the reaction area, i.e., the electrode area. The present invention proposes that the efficiencies should be improved by making maximum electrode into a planar shape by molding the gas pump into a flat plate, and that the current path distance cloud be shorter by making the electrolyte thinner in film, and further, that the gas pump should be larger in capacity by building-up the flat plate shaped gas pumps.

Cylindrical type construction is proposed for larger capacity and higher functions. According to the present invention, the electrolyte itself is made cylindrical to provide each gas pump with strength for ensuring the gas passage. Further, according to the present invention, the capacity can be made larger with longer cylinders and with piping bundled. Also, according to the present invention, the cylinder type with its one end being closed like a Tammann tube comes to have advantages in that strength is improved further, working is easier, gas sealing is simpler in construction, and so on.

The present invention proposes that honey-comb type construction be provided for larger capacity, higher efficiency and higher functions. The honey-comb construction is higher in strength and function as a means for realizing the highest pump efficiency.

The electrochemical pump can be realized larger in capacity and higher in efficiency and function with the use of the construction of the present invention.

Some means for reacting the oxygen within the container are proposed as means for removing the oxygen within the warmer. Hydrogen is introduced into the container to substitute the oxygen into water (steam). Also, catalyst including platinum is characterizes to be used for smoother promotion of the reaction at room temperatures. The oxygen can be substituted into steam in a moment by introduction of the hydrogen.

Also, hydrogen introduction can be realized by the electrolysis of water using the electrolyte as a means for producing the hydrogen, and by using hydrogen storing metal or alloy as a means for once storing the hydrogen.

Finally, it is proposed that a large amount of nitrogen be introduced into the warmer in a moment as a mean of diluting the oxygen concentration even within the warmer. In the present prevention, oxygen is removed in advance from air outside of the warmer to produce the nitrogen as a means for feeding the nitrogen. The present invention is characterized in that an oxygen pump is used as the means. The invention is characterized in that preferably an electrochemical oxygen pump of solid electrolyte easier to maintain, and a BaCe-oxide which is high in oxide ion construction for producing the nitrogen at higher speed may be used.

The above described means makes it possible to remove the oxygen within the warmer and to lower the concentration with larger capacity, higher efficiency and in a moment, and prevent the rice from becoming yellow in tint and smelling unpleasant during the warming. Also, the present invention can realize the warmer of simple, compact construction.

BRIEF DESCRIPTION OF THE DRAWINGS

FIG. 12 is a graph showing the relationship between the current density and the steam discharge amount;

FIG. 15 is a graph showing the relationship between the operating time of the gas pump and the oxygen concentration within the warmer;

FIG. 21 is a principle chart of the present invention.

DETAILED DESCRIPTION OF THE PREFERRED EMBODIMENTS (Embodiment 1)

A cooked rice warmer in a first embodiment of the present invention will be described hereinafter with reference with FIG. 1.

Figure 1:
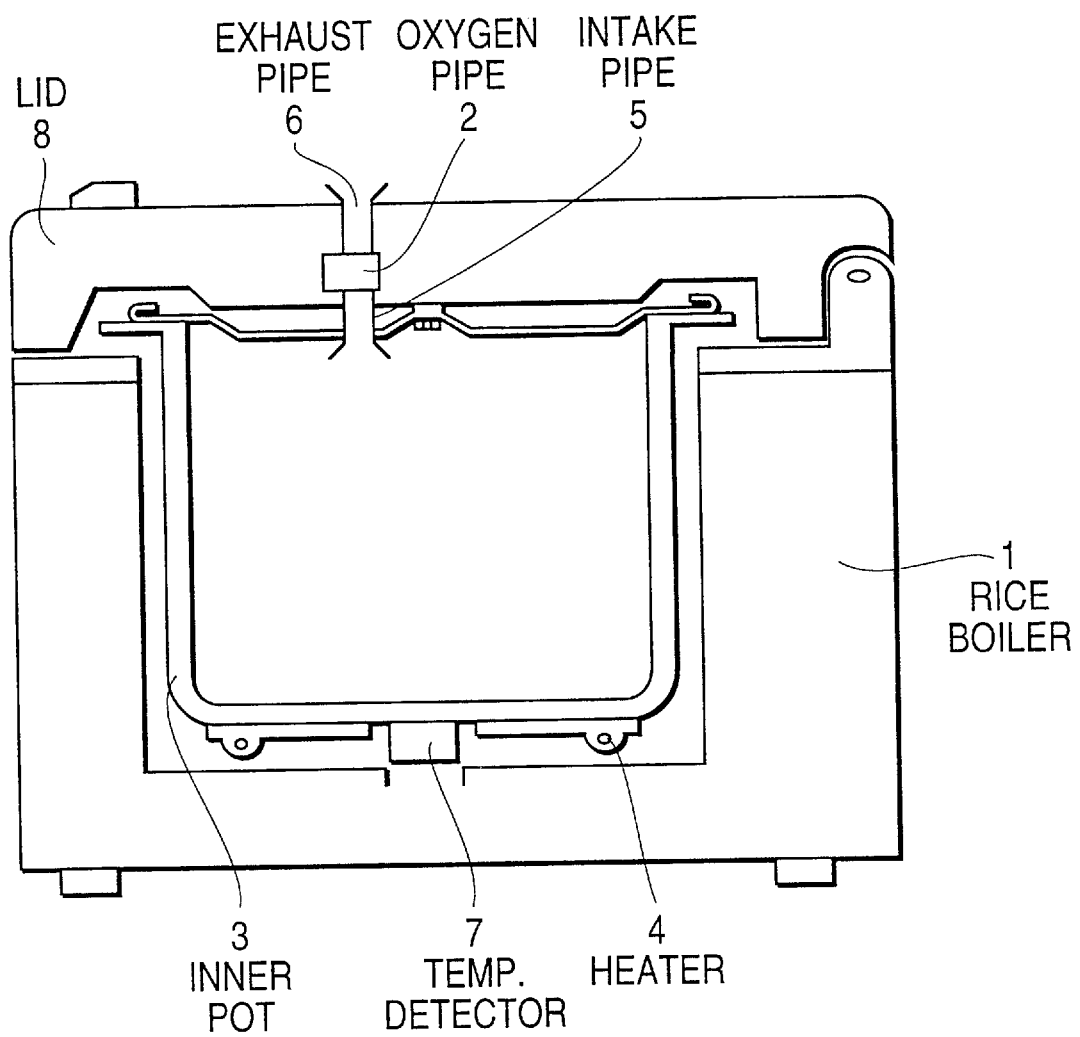
FIG. 1 is a sectional view of a rice cooker in an embodiment of a warmer of the present invention.

FIG. 1 shows a sectional view of a cooked rice warmer in the first embodiment of the present invention. In FIG. 1, a rice cooker is composed of a main body 1 and a lid 8 for opening, closing the top face opening of the cooker main body 1. An inner pot 3 into which rice, water, cooked rice is put is detachably composed within the rice cooker main body 1.

Also, a heater 4 for heating the inner pot 3 to cook the rice and keep the warmth of the rice is provided in the bottom portion of the rice cooker main body 1. A pot temperature detector 7 provided in the central portion is in contact with the inner pot 3 to detect the temperature of the rice, water before the cooking, and of the rice cooked. Further, the lid 8 has an air intake pipe 5 communicated with the inner pot 3 provided therein. An oxygen pump 2 using solid electrolyte is connected to the air intake pipe 5. An exhaust pipe 6 communicated with the outside of the lid 8 is provided on the other face of the oxygen pump 2.

Figure 2:
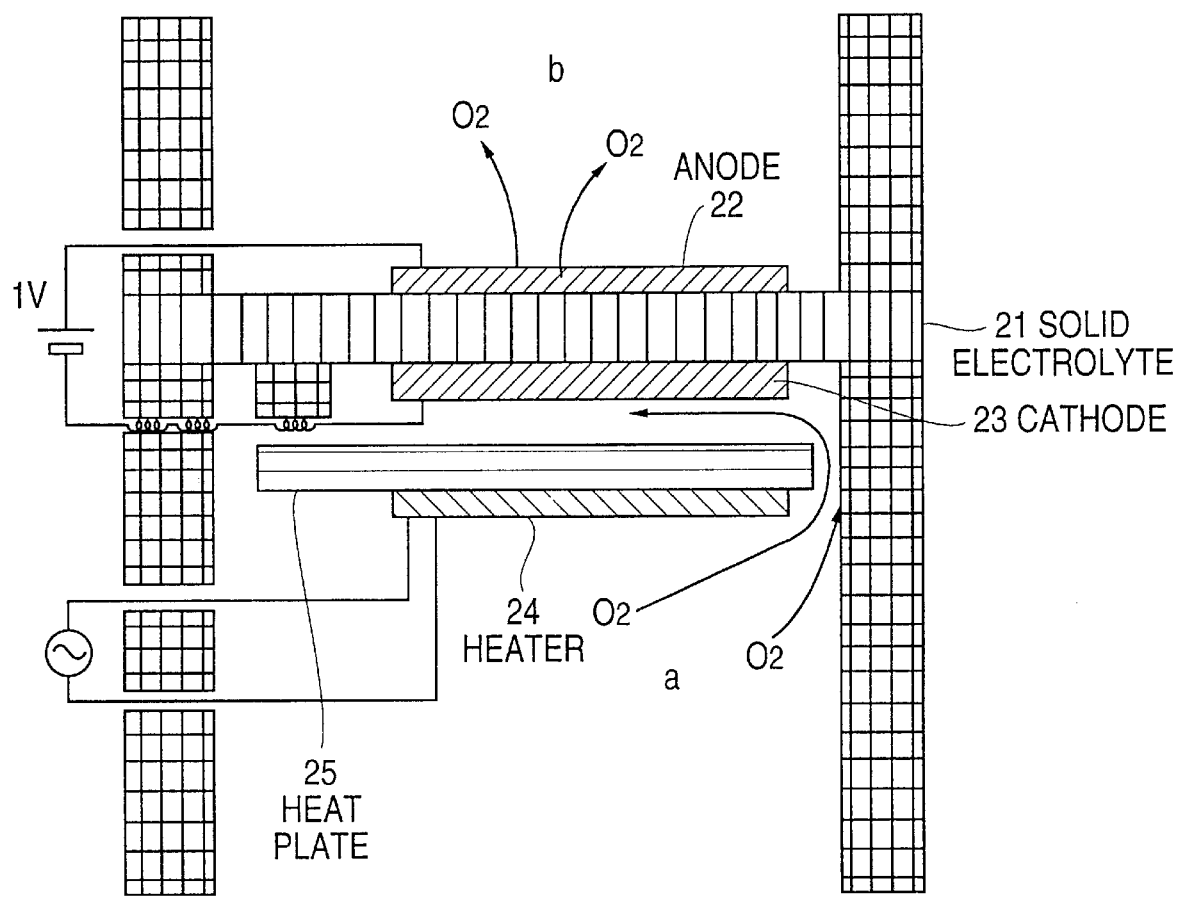
FIG. 2 is a sectional view of an oxygen pump of solid electrolytes of the present invention.

Then, FIG. 2 shows the detailed sectional view of the oxygen pump 2 in FIG. 1. In FIG. 2, a chemical formula of the using solid electrolyte 21 is $BaCe_{1-x}Gd_xO_{3-\alpha}$, which is formed by abrading so as to become about 0.5 mm in thickness after the sintering operation. Further, porous electrodes 22, 23 (for example, Ni or Pt) are formed on both the faces of the abrased solid electrolyte 21 to impress about 1 voltage in DC voltage.

Although oxygen ions are not conducted into the solid electrolyte 21, the oxygen reached to a cathode 23 is taken in as oxygen ions into the solid electrolyte 21 by reaction of

$$O_2 + 4e^- \rightarrow 2O^{2-} \qquad (1)$$

and is conducted towards an anode within the solid electrolyte 21 through the empty holes of the oxygen within the solid electrolyte 21 when the heating is effected to 300° C. or more by provision of a heater 24 for heating use on, for example, the cathode side as shown in FIG. 2. And the oxygen ions reached to the anode 22 is released as the oxygen molecule b by the reaction of

$$2O^{2-} \rightarrow O_2 + 4e^- \qquad (2)$$

Figure 3:
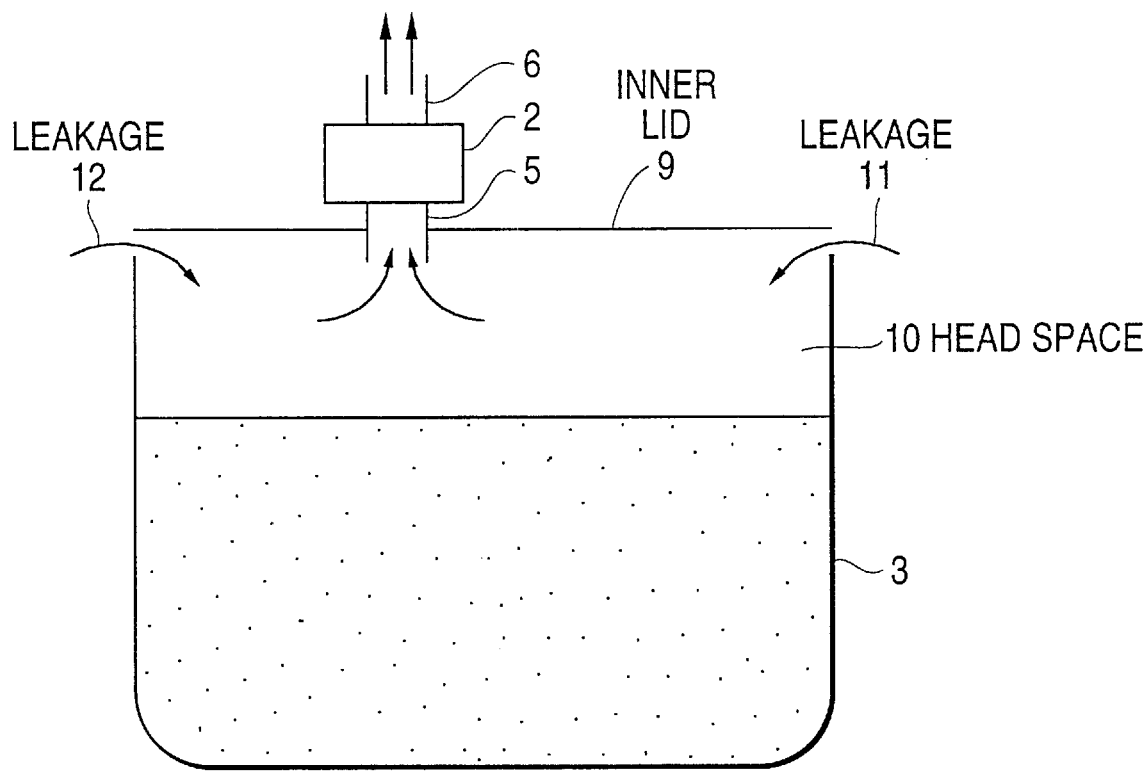
FIG. 3 is a sectional view of a cooker in the embodiment of a warmer of the present invention.

Accordingly, the oxygen of the head space 10 between the cooked rice within the inner pot 3 and the inner lid 9 can be released outside from the inner pot 3 in accordance with the reaction formulas (1) and (2) as shown in FIG. 3 by heating through impression of the voltage upon theater 24 for heating use of the oxygen pump 2.

Figure 4:
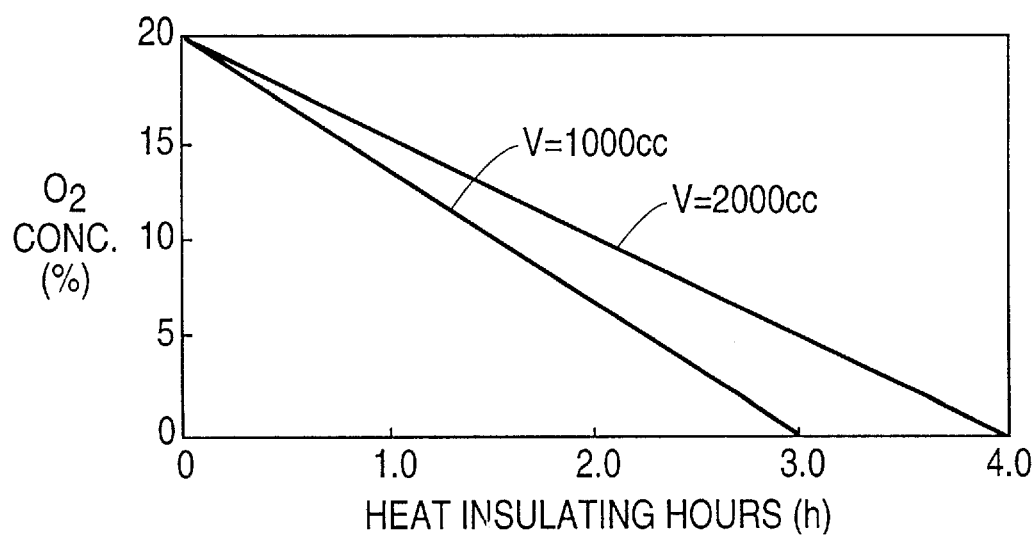
FIG. 4 is a graph showing changes in the oxygen concentration of a head space by an oxygen pump

FIG. 4 shows the time change in the oxygen concentration of the inner pot 3 when air (nitrogen:oxygen=4:1) the same in volume as oxygen discharged by the oxygen pump 2 is supposed to enter the inner pot 3 through leakages 11, 12. The size of the oxygen pump is 5 ×5 $cm^2$ with 2500 mA flowing in current. A pumping out amount of the oxygen is obtained from the Faraday's law, because it is equivalent to the oxygen ion amount for moving the solid electrolyte 21.

The oxygen concentration within the inner pot 3 becomes 0.5% or lower in about three hours when head space 10 within the inner pot 3 is 1000 cc. The oxygen concentration within the inner pot 3 becomes 0.5 or lower in about 4 hours when it is 2000 cc. The oxygen concentration within the inner pot 3 is considerably lowered, by the driving of the oxygen pump 2, to prevent the rice from becoming yellow tint and causing smells by keeping the warmth of the rice, thus obtaining extremely good warmth condition.

According to the present embodiment as described above, the oxygen within the inner pot 3 can be removed by the extremely simple construction of oxygen pump using the solid electrolyte, and the weight of the cover body can be reduced, thus preventing the adhesion of the dewing water Further, in the present invention, the oxygen pump made of solid electrolyte is used with no unpleasant sounds being generated because of no mechanical portions. The oxygen pump which is extremely durable with respect to the warmer to be used for longer period of time is provided with considerably lower cost.

In the above described embodiment, although BaCeGdO system is used as the solid electrolyte 21, it is needless to say that materials such as $ZrO_2O-CaO$ system, $Tho_2-Y_2O_3$ system, $CeO_2-La_2O_3$ system, $Bi_2O_3-Y_2O_3$ system, $ZrO_2-Y_2O_3$ system, $ZrO_2-Yb_2O_3$ system, $CeO_2-Gd_2O_3-MgO$ system or the like can be used. The same oxygen as in the embodiment can be obtained with the operating temperature being made 500° C. or more in them.

(Embodiment 2)

A cooked rice warmer in a second embodiment of the present invention will be described hereinafter with reference to FIG. 5.

Although the higher performance of the oxygen pump can be realized when the solid electrolyte is made larger in the first embodiment, there is a method, in addition to this method, of using many solid electrolytes of about 2 $cm^2$ in area. The embodiment thereof will be described with reference to FIG. 5.

Figure 5:
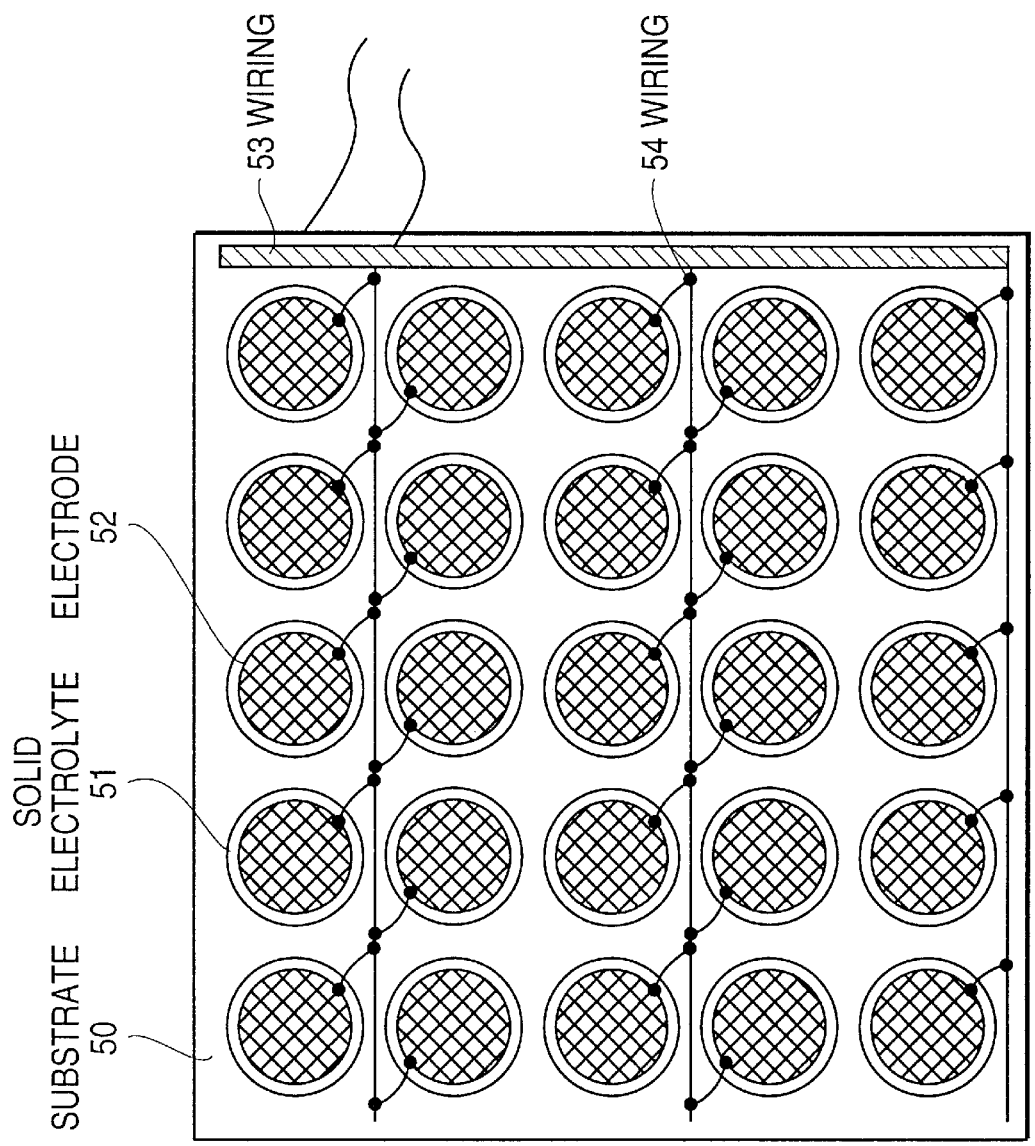
FIG. 5 is a schematic view of solid electrolytes arranged on the substrate of the present invention.

In FIG. 5, the solid electrolyte 51 of, for example, BaCeGdO system is sintered, is worked as thick as about 0.5 cm, and then, electrodes 52 of Pt, Ni or the like are formed on both the faces. The solid electrolyte 51 is fixed with inorganic bonding agent, with $SiO_2$ as a major component, or the like to close holes on holed substrate 50 with $Al_2O_3$ as a major component. A wiring 53 is provided on both the faces of the substrate 50 with the wiring 54 of lead wire or metal thin film provided from the electrode 52 of the solid electrolyte 51.

Figure 6:
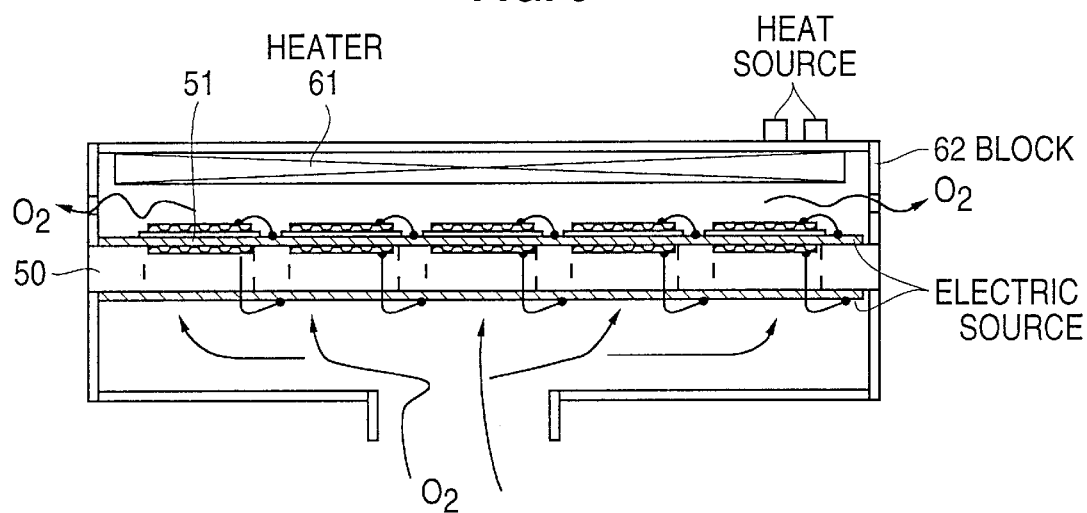
FIG. 6 is a sectional view of the oxygen pump of solid electrolytes of the present invention.

FIG. 6 is a sectional view of an oxygen pump. A heater 61 is provided immediately above the solid electrolyte 51. A stationary block 62, made of ceramics with $Al_2O_3$ as a major component, having a hole for oxygen discharging use to open a gap of about 0.5 through 1.0 mm is adjusted, because a passage or discharging the sucked oxygen, although it is ideal to have the solid electrolyte 51 and the heater 61 in contact with each other to efficiently heat the solid electrolytes 51. The inorganic bonding agent is used as bonding agent for fixing use at this time. The suction side is narrowed with ceramics with $Al_2O_3$ as a major component not to escape the heat as much as possible. The solid electrolyte 51 can be heated to a given temperature with low consumption power by covering of the entire oxygen pump with insulated material (not shown) made of, for example, calcium silicate.

Although the oxygen pump described in the first embodiment has an advantage of being made smaller as an oxygen pump despite of large area to make the solid electrolyte itself large, the characteristics of the solid electrolyte are hard to improve with the yield being somewhat inferior because of poor handing at the working in making it larger. In the present embodiment, the individual solid electrolyte is smaller in area and the characteristics of the solid electrolyte itself are easier to improve and work though the entire oxygen pump is likely to become somewhat larger. Also, according to the present embodiment, the oxygen pumping out performance is remarkably improved, because the larger area in total can be made easier with the use of a plurality of small area solid electrolytes in the case of the solid electrolyte hard to make larger in area. When the solid electrolyte 51 of 2 $cm_2$ is arranged on the substrate 50 of 10 cm×10 cm as shown in, for example, FIG. 5, the total area of the solid electrolyte becomes 50 cm$_2$. When it is heated to 500° C., the oxygen pumping out speed becomes about 15 cc/min. The oxygen concentration can be made 1% or lower in about one hour when the head space is 5000 cc.

In accordance with the present embodiment described above, the oxygen concentration within the inner pot 3 is considerably lower in an extremely short time period by the driving of the oxygen pump so as to prevent the cooked rice from becoming yellow in tint and causing smells by keeping the rice warm, thus obtaining an extremely good warmth condition.

(Embodiment 3)

A cooked rice warmer in a third embodiment of the present invention will be described hereinafter with reference to FIG. 7 and FIG. 8.

Figure 7:
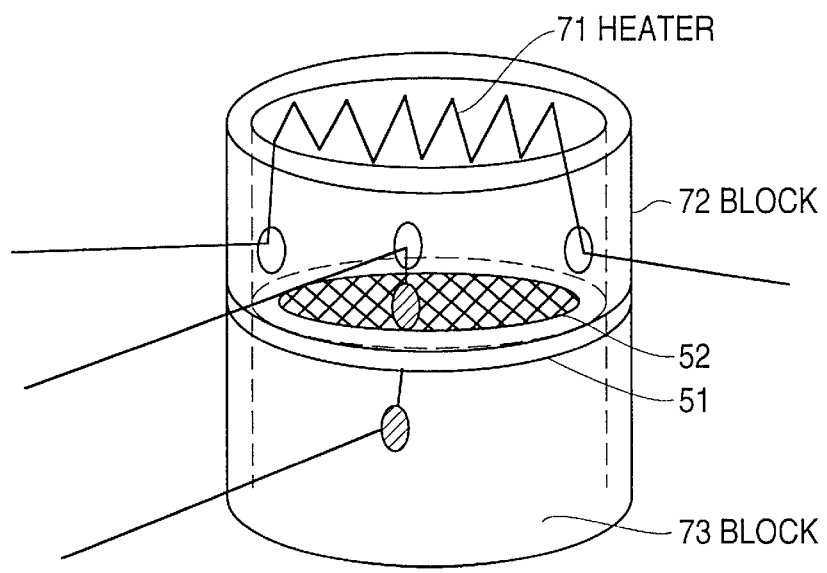
FIG. 7 is a perspective view of the solid electrolyte oxygen pump of the present invention.

An oxygen pump shown in FIG. 7 is made with the use of solid electrolyte 51 of about 2 cm$^2$ in area. An electrode 52 made of Pt or Ni is formed on both the faces of the solid electrolyte 51. Also, a heater 71 is fixed in the position of 0.5 through 1.0 mm immediately above the solid electrolyte 51 with a fixing block 72 with holed ceramics, with $Al_2O_3$ as a major component. Inorganic bonding agent is used as bonding agent for fixing at this time. A fixing block 73 is used even on the suction side. The block 73 has a hole through which lead wire is taken out. The hole is closed with inorganic material after the lead wire has been taken out.

Figure 8:
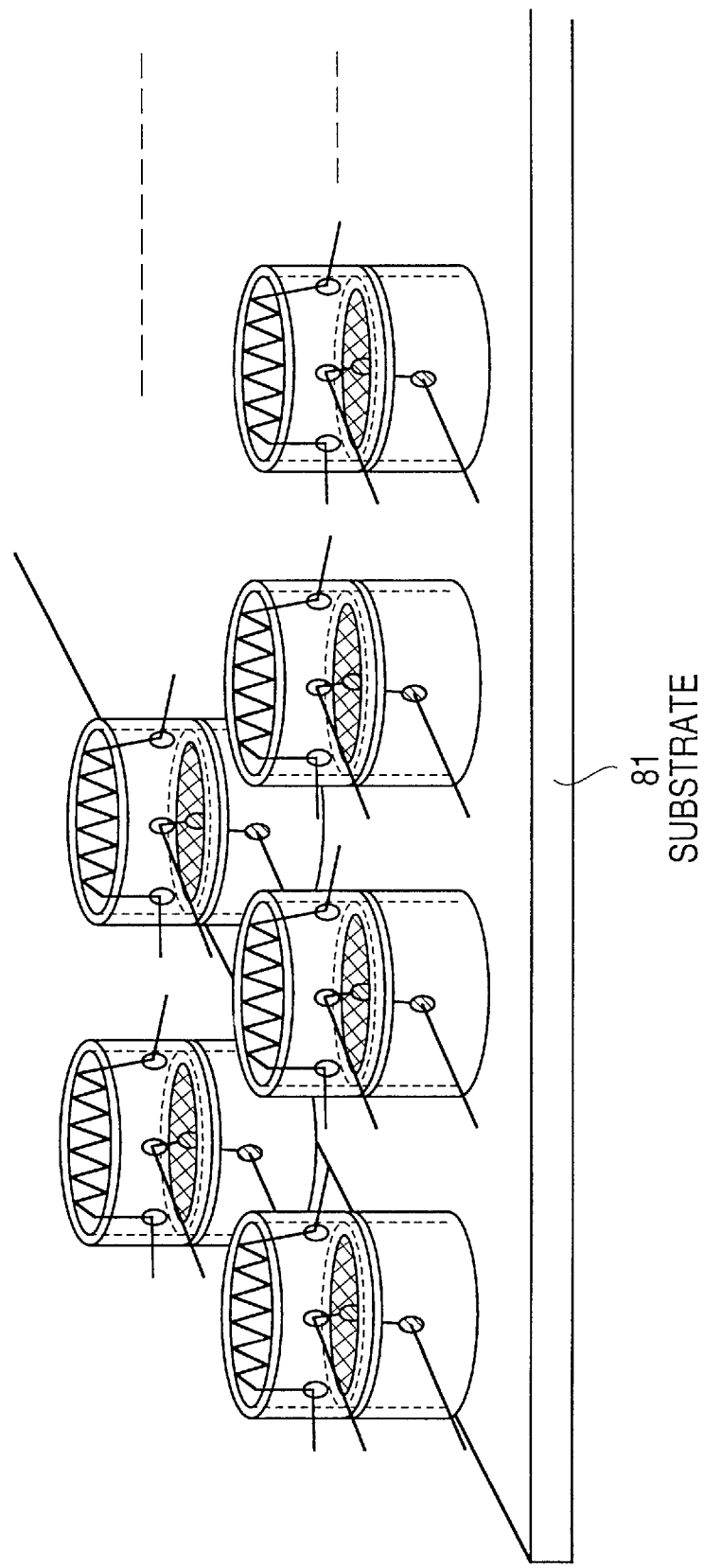
FIG. 8 is a perspective view of an oxygen pump of the solid electrolyte of the present invention.
Figure 9:
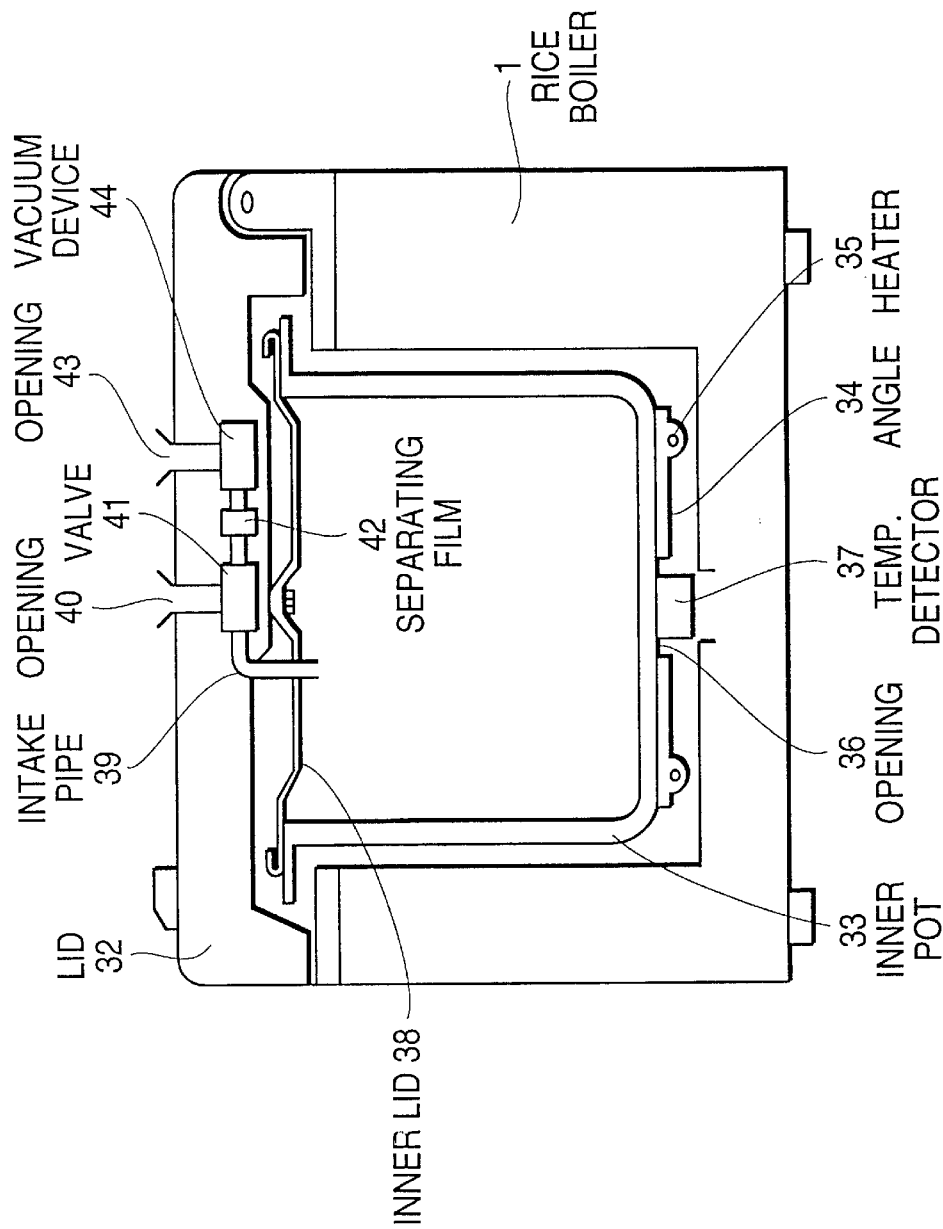
FIG. 9 is a sectional view showing a rice cooker in one example of the conventional warmer.

The oxygen pump is arranged to close the hole on the substrate 81 holed as shown in FIG. 8 to fix with the use of the inorganic bonding agent. After fixing the oxygen pump, the solid electrolyte 51 not shown and the lead wire coming out of the heater 71 are respectively connected with each other so that the entire portion thereof may be covered with adiabatic materials of, for example, calcium silicate. Even in the present embodiment, the oxygen pumping out performance is considerably improved as in the second embodiment although the entire oxygen pump is likely to become somewhat larger as compared with the first embodiment.

When the solid electrolyte 51 of 2 cm$^2$ is arranged by 25 pieces as shown in, for example, FIG. 5, the total area of the solid electrolyte becomes 50 cm$^2$. When heated to 500° C., the pumping out speed becomes about 15 cc/min. The oxygen concentration can be lowered to 1% or less in about one hour even when the head space is 5000 cc.

In accordance with the present embodiment described above, the oxygen concentration within the inner pot 3 is considerably lower by the driving of the oxygen pump so as to prevent the cooked rice from becoming yellow in tint and causing smells by keeping it warm, thus obtaining an extremely good warmth condition. Also, in the present embodiment, the oxygen pump can be formed into optional shape, because the heaters 71 are provided in the individual solid electrolyte.

Although the adiabatic materials of calcium silicate are used for the adiabatic material covering the cuter side of the heater for eating use in the second embodiment and the third embodiment, it is needless to say that fire-proof adiabatic brick of high alumina quality, clay quality adiabatic brick, diatom earth quality adiabatic trick, castable fire-proof material, quartz glass quality adiabatic material, ceramic·fiber, carbon fiber can be used.

(Embodiment 4)

The present embodiment shows an example where oxygen within the warmer is removed and steam is introduced into the warmer by the use of oxide for transmitting protons and oxide ions into the solid electrolyte. In the embodiment, an electric chemical pump for performance evaluation has been made for trial for examination of the characteristics.

Figure 10:
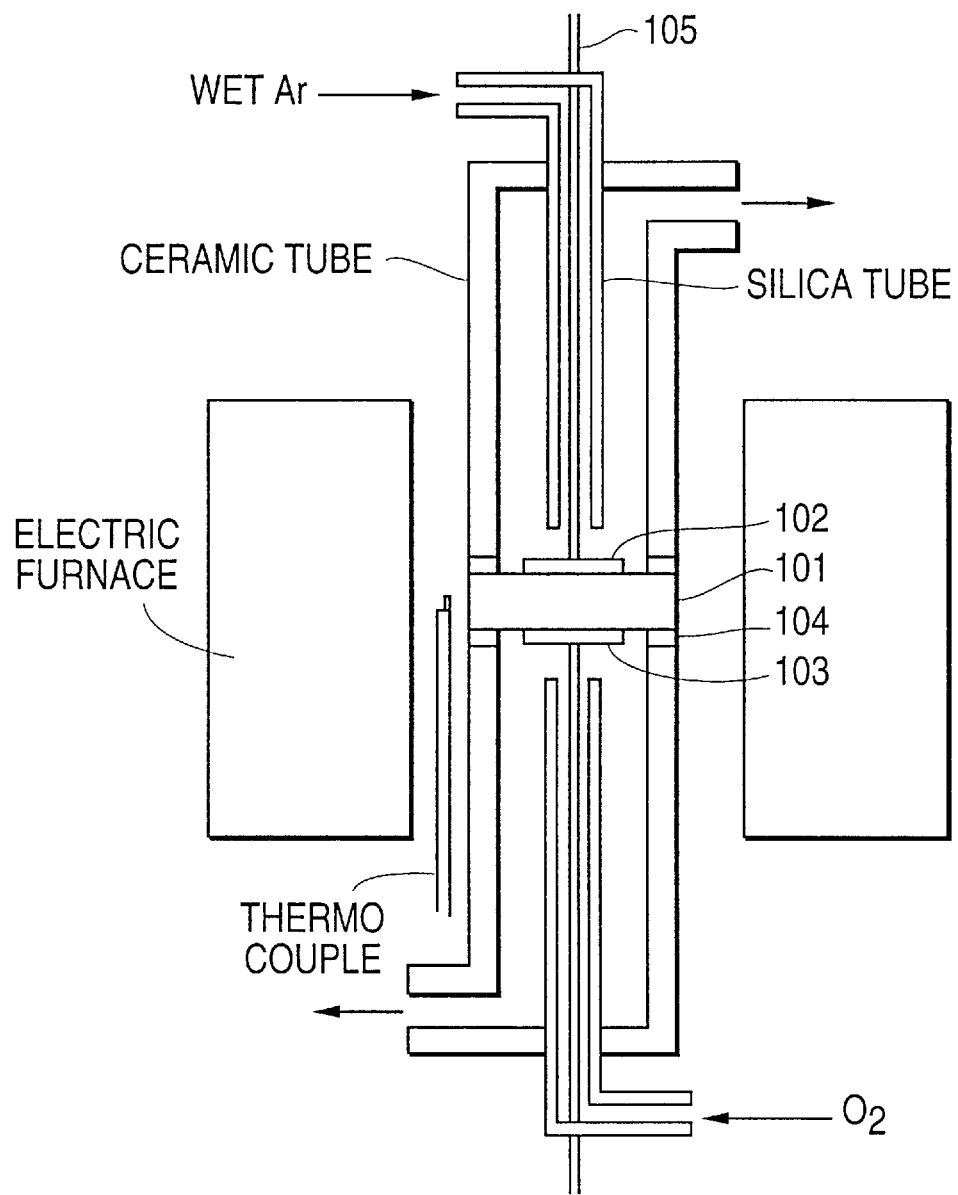
FIG. 10 is an electric chemical pump for experiment to be used in the present invention.

FIG. 10 shows the construction of the electric chemical pump for experiments, and an evaluation apparatus used in the present embodiment. The sintered body of $BaCe_{0.8}GD_{0.2}O_{3-\alpha}$ (BCG) of 13φ×0.5 mm in thickness is used for the solid electrolyte 101 of the electric chemical pump, the platinum electrode (paste baking) of 0.5 cm$^2$ in electrode area is used for anode 102, cathode 103. The anode chamber and the cathode chamber respectively are sealed to have the estimation of gas to be pumped out or produced by the electric chemical pump. In the present embodiment, dry/wet argon and dry oxygen are fed to the anode chamber and the cathode, respectively, to estimate the oxygen concentration and the steam amount of the anode chamber and the cathode chamber. Glass and platinum are used as sealing material 104 and lead 105 for energization, respectively.

Figure 11:
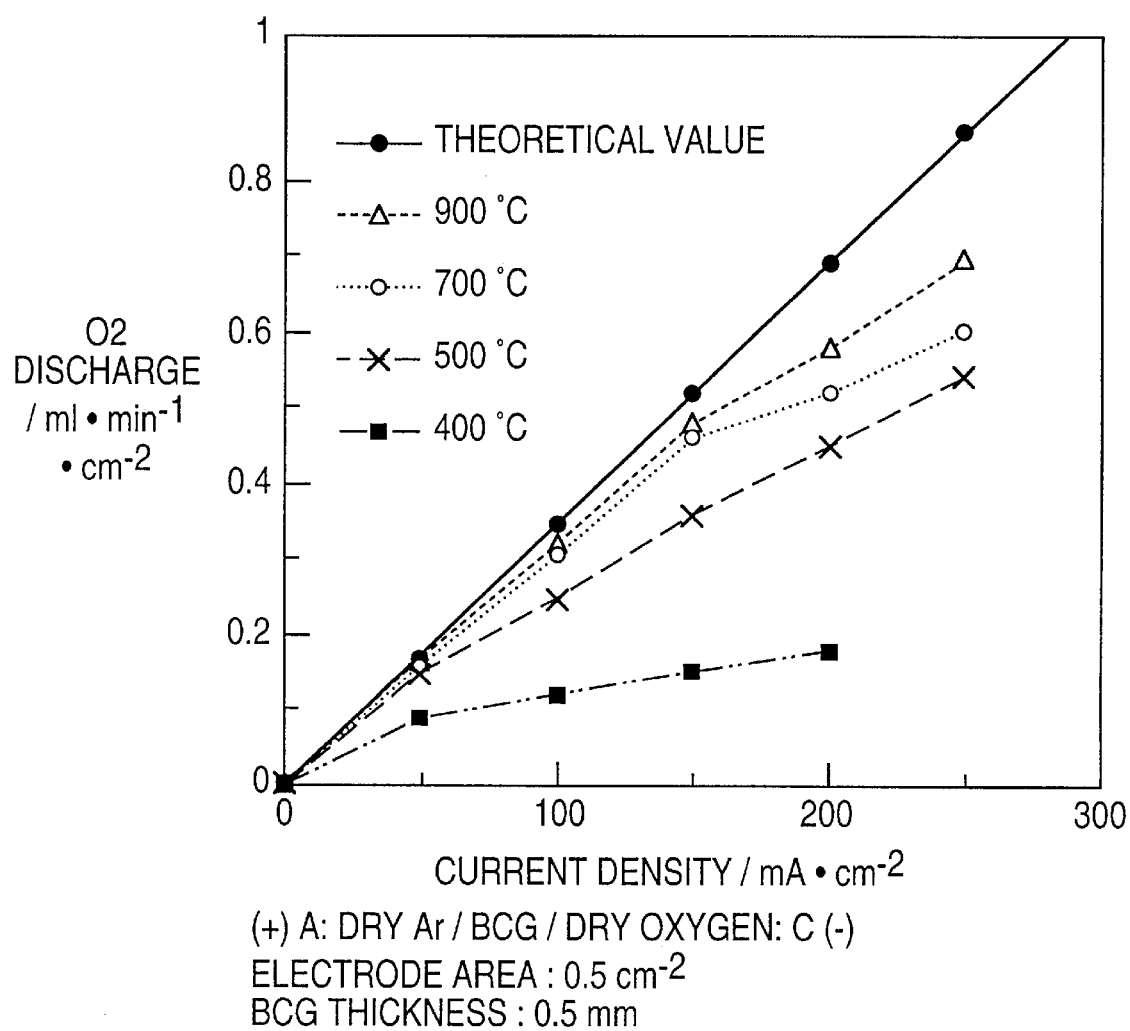
FIG. 11 is a graph showing the relationship between the current density and the oxygen discharge amount.

FIG. 11 shows the oxygen discharge amount, with the current density, at the time of using the dry argon/BCG/dry oxygen. It is found out that the oxygen is pumped out without fail although the oxygen pumping efficiency is lowered as the temperature (400° C.) is getting lower. Also, it is found out that the oxygen pumping out (10% in efficiency) is carried out in accordance with approximate Faraday's law.

Then, wet argon/BCG/dry oxygen are used to check the steam pump performance through the proton conduction. It is found out in FIG. 12 through the examination of the amount of the steam produced to be produced in the cathode that the proton conductive property is increased and the steam discharge amount is increased as the temperature becomes lower. It is found out that the total of the oxygen pumping amount and the steam pumping amount are equal to the power amount accordance with the Faraday's law.

It is found out from the above results that the BCG material works as the steam pump simultaneously with the oxygen pump and as the gas pump for oxygen removing on the cathode side and for steam conversion. Of course, the steam produced on the cathode side can make up for the pressure reduced portion to be caused by the oxygen removing so that better functioning is provided when it is used in the warmer. Also, it is found out that the oxygen pump and the steam pump are working at the same time, showing the mixed ion conduction of oxide ions and protons with M of barium cerium system oxide $BaCe_1-M_xO_{3-\alpha}$ is replaced by La, Pr, Nd, Pm, Eu, Tb, Dy, Ho, Er, Tm, Yb, Y. From the results examined about the addition amount x of the M at this time, it is considered that the proton conduction property is shown from 0.05 and the sintering of the oxide is hard to effect at 0.27, thus resulting in maximum solid solution amount. Accordingly, it is found that practical mixed ion conductor is obtained within the range of 0.05 through 0.26 in x.

Concretely a BCG material described in the specification of the U.S. Pat. No. 5,387,330 can be used.

(Embodiment 5)

The present embodiment shows an example of the practical construction of the electric chemical pump in the above described embodiment. The present embodiment is an example of a flat plate built-up construction of the present invention.

Figure 13A:
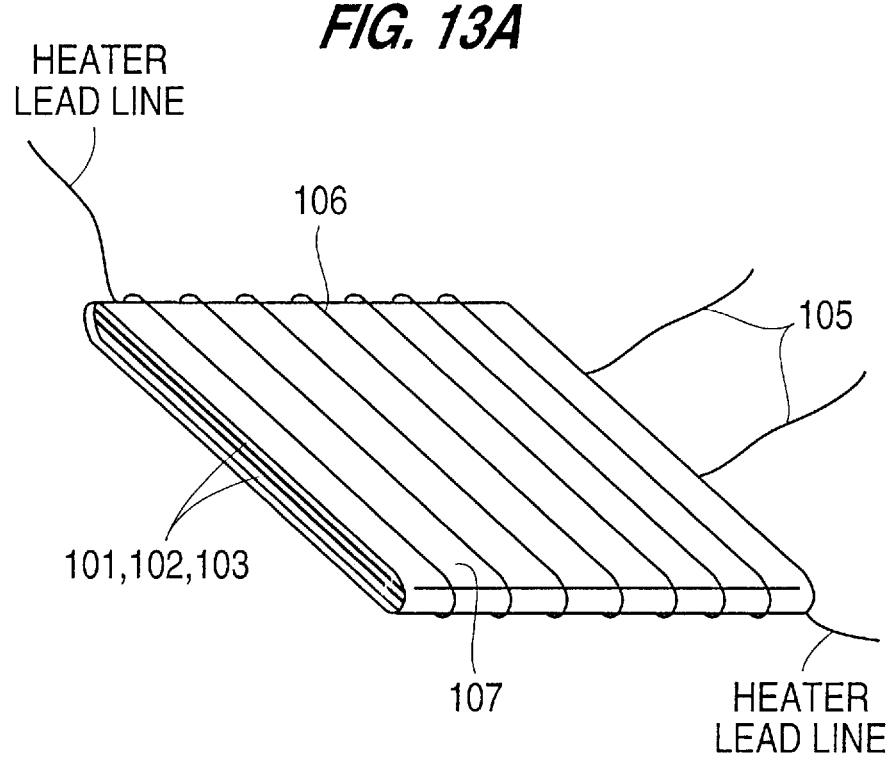
FIG. 13 is an electric chemical pump of flat plate built-up construction.
Figure 13B:
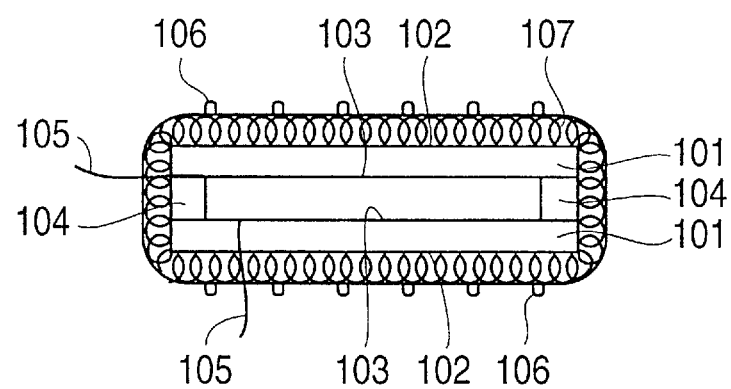

FIG. 13 shows the electric chemical pump of the flat plate built-up construction which is one example of the present invention. The respective flat plate type of gas pump is composed with the use of $BaCe_{0.8}Y_{0.2}O_{3-\alpha}$ in the solid electrolyte 101 and of platinum in both the electrodes of the anode 102, and the cathode 103. In the present embodiment, first the solid electrolyte is made by a solid phase sintering method, and the sintered body obtained is cut, worked into 0.5 mm in thickness, 3 cm in angle. Platinum paste TR7905 made by Tanaka Kikinzoku Co. is applied, baked on both the faces thereof to make one sheet of flat plate gas plump. Two pumps are made and three sides are spliced with ceramic bond 104 so that the space between two pumps may become about 2 mm to take out the cathode lead 105 from released one side. The lead 105 is taken out likewise even on the anode side to cover the circumference with fibrous insulating material with a line heater 106 being bundled on it. The entire pump is adiabatic with a fibrous adiabatic material 107.

Figure 14:
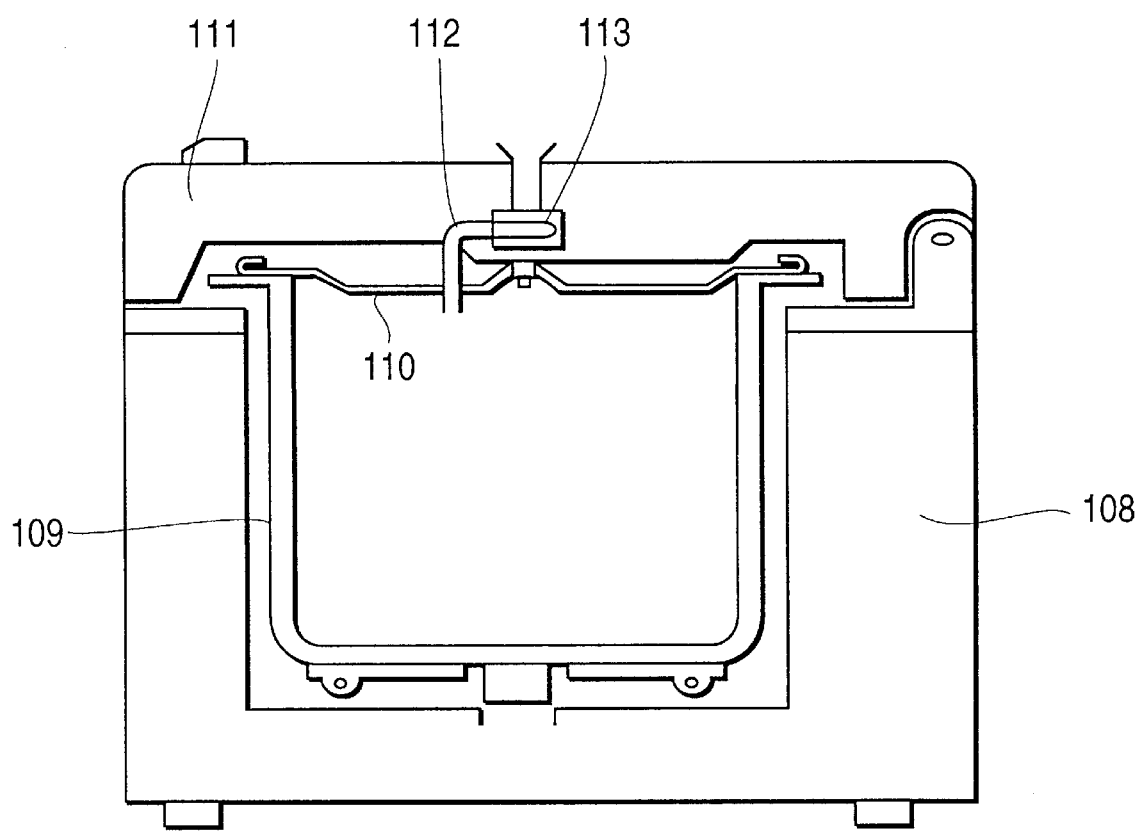
FIG. 14 is a mock warmer with a flat plate built-up type gas pump being engaged with it.

The performance of the flat plate built-up type gas pump is checked about changes in the oxygen concentration of the interior mounted in the mock warmer. FIG. 14 shows the sectional view of the mock warmer. The inner pot 109 of volume 11 is provided in the outer container 108 and is closed by an internal cover 110. The internal cover is accompanied by the cover body 111. The internal cover and the inner pot are closed through closing of the cover body. An air intake pipe 112 is provided between the cover body and the internal cover with the cathode side of the gas pump 113 with respect to the air intake pipe being mounted within the warmer. The gas pump of 12.5 cm$^2$ in the electrode area is heated to about 400° C. with the mock warmer empty, and the current of 1.25A (100 mA/cm$^2$) is energized. The oxygen concentration with respect to time of the gas pump operated is plotted (FIG. 15). It is confirmed that the oxygen concentration becomes 1 through 2% in about one hour. It is found out that the flat plate built-up gas pump of simple construction is effective in the oxygen pumping of the large capacity resulting in practical gas pump in construction. Also, it is confirmed that the steam amount within the warmer increases to about 10% at the same time so that the pressure does not become negative within the warmer. It is found out from the present experiments that the pump efficiency is better as the area of the flat plate is thinner and larger. It is confirmed that in 1 mm in thickness, the time taken to reach the same oxygen concentration becomes twice in the above described system.

In the present embodiment, any size such as rectangle, polygon, or disk without restricted to the size shape of the flat plate, and the making method allows any means without restriction in the making method. Also, the built-up in number may be any such as three or four.

(Embodiment 6)

The present embodiment shows an example of the functional construction of the electric chemical pump. The present embodiment is an example of the cylindrical pipe construction of the present invention.

Figure 16A:
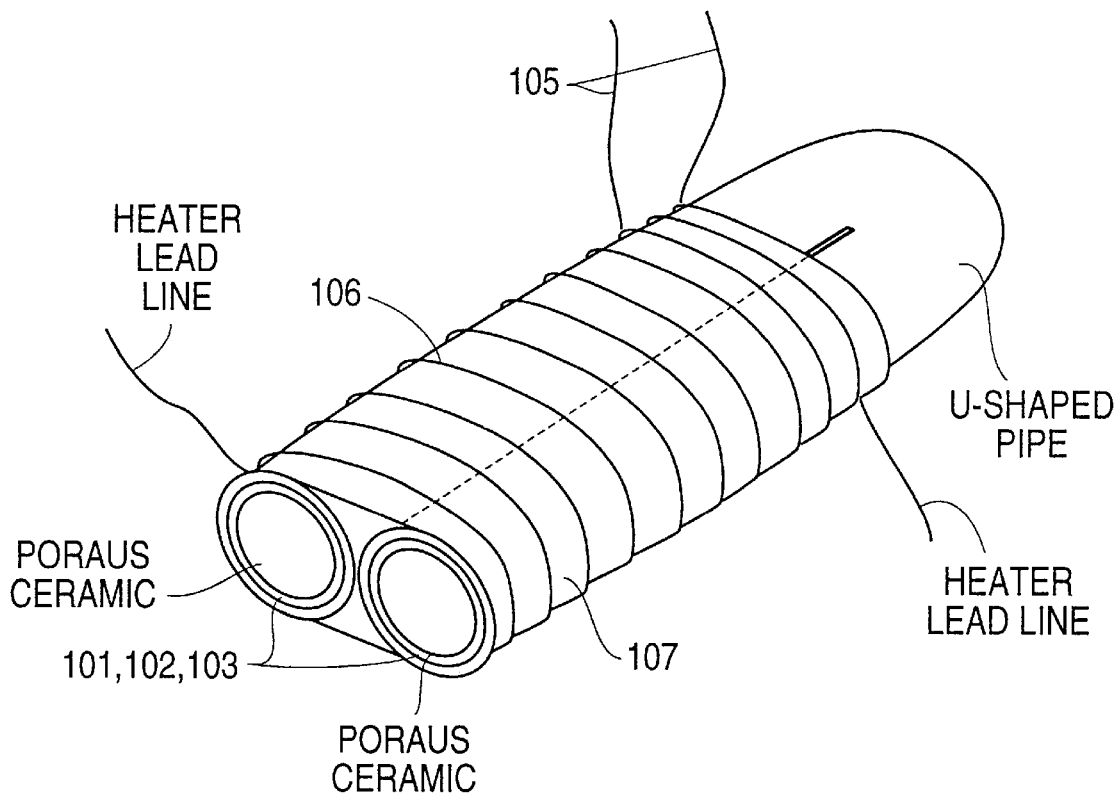
FIG. 16 is an electric chemical pump of cylindrical pipe construction.
Figure 16B:
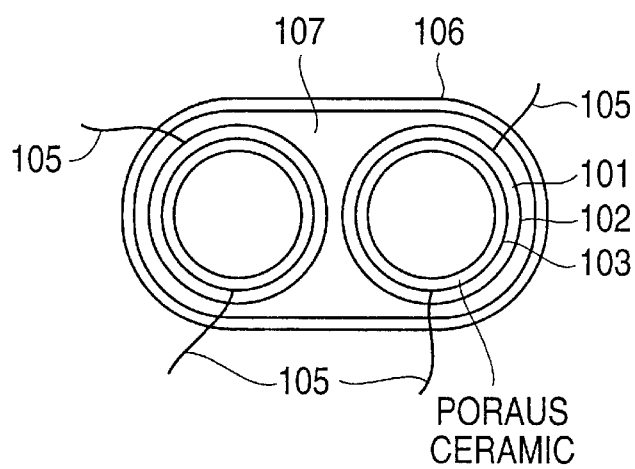

FIG. 16 shows the electric chemical pump of a cylindrical construction in one embodiment of the present invention. The cylindrical gas pump is composed with the use of $BaCe_{0.85}Gd_{0.15}O_{3-\alpha}$ in the solid electrolyte 101 and of platinum in both the electrodes of the angle 102, and the cathode 103. In the present embodiment to make the pump, first, platinum is applied on porous ic cylindrical pipe of 10 mm in outer diameter, 70 mm in length, the solid electrolyte is formed into thickness of 1 mm by a plasma solution injecting method on it, further the platinum electrode is applied. Two cylindrical pipe type of pumps are made in this manner. Two pumps are spliced with glass U-shaped pipe and also, and the heating heater 106 and the fibrous adiabatic material 107 are mounted. The splicing pump is mounted in the mock warmer shown in FIG. 14 as in the embodiment 5 to check the gas pup characteristics.

The gas pump is heated to about 400° C. as in the above described embodiment 5 to energize the current of 3 A (100 mA/cm$^2$). The oxygen concentrations with respect to the time for which the gas pump is operated is plotted (FIG. 15). It is firmed that the oxygen concentration becomes 1 through 2% in about 30 minutes. It is found out that the cylindrical pipe type of pump is simple in construction and is effective in pumping out of the large capacity oxygen, thus resulting in practical gas pumping construction. Further, in the cylindrical pipe type, the number of the pipes is easier to increase, resulting in pump construction effective especially for the gas pump of large capacity. In addition, the cylindrical pipe type can be used as more practical pump, because it is superior in shaking-proof and strength as completed with the flat plate type, and can be used as more practical pump. It is needless to say that the efficiency is more improved as the solid electrolyte is made thinner as in the former embodiment. At least 1 mm or lower is desirable.

In the present invention, any size such as elliptic pipe, angle pipe may be used without limitation to size, shape of the pipe. Any means may be used in the making method without restriction in the method. Also, any pipe may be coupled in number.

(Embodiment 7)

The present embodiment shows an example of higher function construction of the electric chemical pump. The present embodiment is an example of cylindrical pipe construction with one end being closed in accordance with the present invention.

Figure 17A:
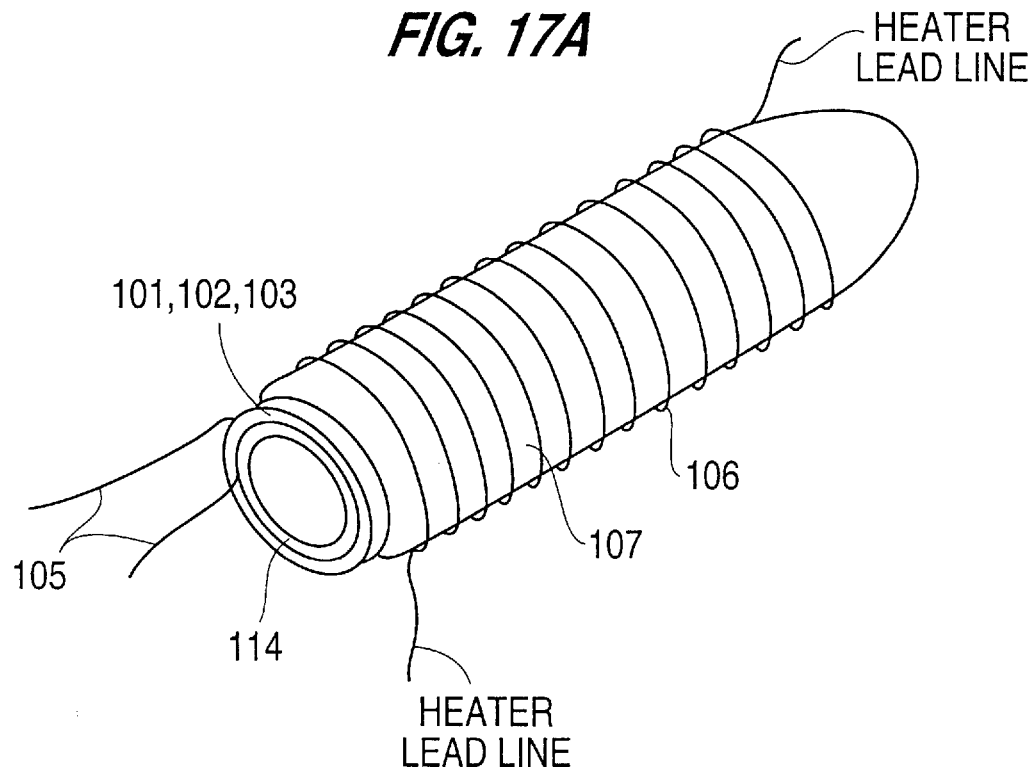
FIG. 17 shows an electric chemical air pump of the cylindrical pipe construction with its one end being closed.
Figure 17B:
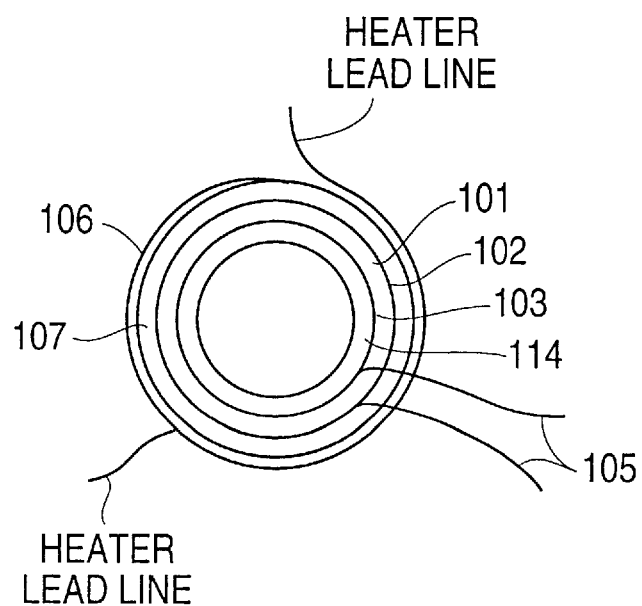

FIG. 17 shows an electric chemical pump of cylindrical pipe construction with one end being closed in one example of the present invention. The gas pump is composed with the use of $BaCe_{0.85}Yb_{0.15}O_{3-\alpha}$ in the solid electrolyte 101 and of platinum in both the electrodes of the anode 102, and the cathode 103. In the present embodiment, a porous ceramic Tamman tube 114 of 15 mm in outside diameter and 50 mm in length with its one end being closed is prepared, platinum is applied on it and is sintered, thereafter is dipped in $BaCe_{0.85}Yb_{0.15}O_{3-\alpha}$ slurry prepared in advance, and the solid electrolyte is sintered again. Platinum electrode is applied again on the sintered solid electrolyte and is baked to make the pump. The heating heater 106 and the fibrous adiabatic material 107 are mounted on the pump and is mounted on the mock warmer of FIG. 14 as in the embodiment.

The gas pump is heated to about 400° C. as in the embodiments 5, 6 and the current of 2A (100 mA/cm$^2$) is energized. It is confirmed that the oxygen concentration becomes 1 through 2% in about 45 minutes. The cylindrical type of gas pump with its one end closed is confirmed to be operating well. It is found out that the pump of the construction is practical gas pump which is simplest in construction and effective in the pumping out of the large capacity oxygen. Further, the number of the pipes is easier to increase, resulting in pump construction especially effective for the gas pump of large capacity. In addition, this construction can be used as more practical pump, because it is superior in shaking-proof and strength as compared with the other construction.

In the present invention, any size such as elliptic pipe, angle pipe may be used without restriction in size, shape of the pipe. Any means may be used in the making method without restriction in the method.

(Embodiment 8)

The present embodiment shows an example of higher efficient construction of the electric chemical pump. The present embodiment is an example of honey-comb construction of the present invention.

Figure 18A:
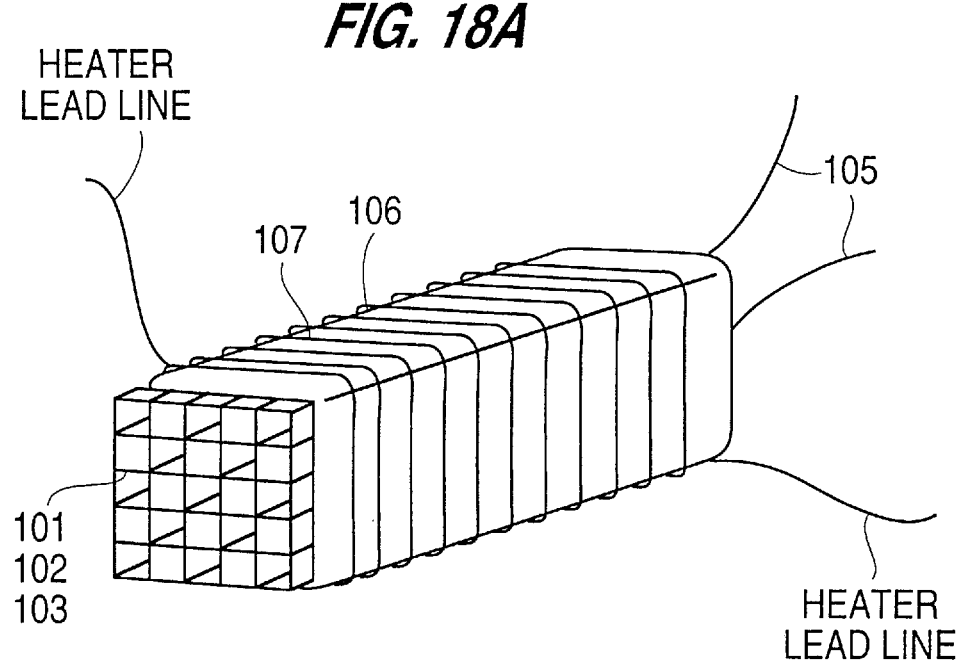
FIG. 18 is an electric chemical pump of honey-comb construction.
Figure 18B:
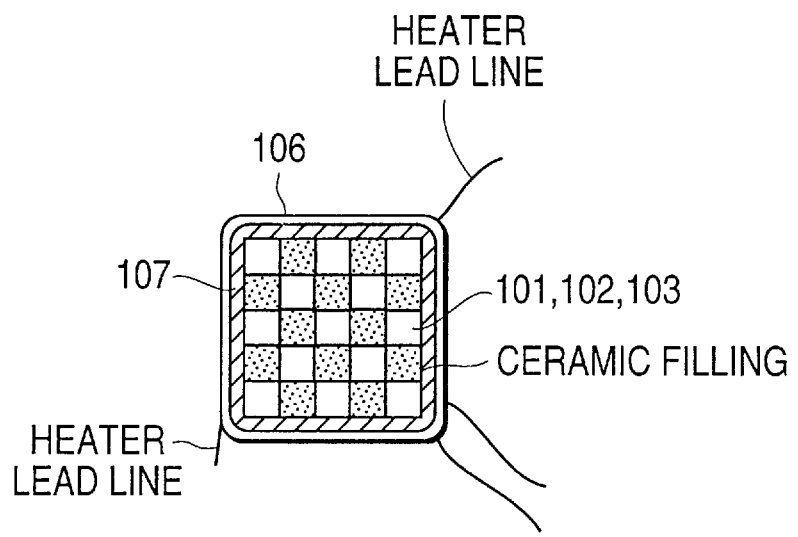

FIG. 18 shows an electric chemical pump of the honey-comb in one example of the present invention. The gas pump is composed with the use of $BaCe_{0.8}Gd_{0.2}O_{3-\alpha}$ in the solid electrolyte 101 and of platinum in both the electrodes of the anode 102 and the cathode 103. In the present embodiment, the honey-comb of the $BaCe_{0.8}Gd_{0.2}O_{3-\alpha}$ is made, sintered by the extrusion molding of $BaCe_{0.8}Gd_{0.2}O_{3-\alpha}$. The size of the honey-comb pane is 3 mm in angle, and 0.3 in thickness, and the honey-comb is 15 mm in angle×30 mm in length. Also, platinum paste is flowed into the honey-comb wall face with one end of the honey-comb being closed alternately with ceramics, to bake the electrode. The heater 106 for heating the honey-comb and the fibrous adiabatic material 107 are mounted on the pump and is mounted on the mock warmer of FIG. 14 as in the embodiment.

The gas pump is heated to about 400° C. as in the embodiments 5, 6, 7 to energize the current of 5A (100 mA/cm$^2$). It is confirmed that the oxygen concentration becomes 1 through 2% in about 15 minutes. The honey-comb type gas pump is confirmed to be operated well. The pump of this construction is adapted to be compact and most effective in oxygen pumping out means although complicated in construction. Also, it is found out that the means is practical with the manufacturing of the solid electrolyte hone-comb itself being simple. Further, the pump construction is especially effective for the gas pump of larger capacity, because the honey-comb is easier to make large.

In the present invention, any size will do without restriction in the size shape, the making method of the honey-comb. Any means of the honey-comb may be used.

(Embodiment 9)

The present embodiment shows an example about the warmer provided with means for reacting the gas within the warmer, means for producing hydrogen, means for storing the hydrogen. The present embodiment is an example where catalyst including platinum, hydrogen are used as means for substituting the oxygen within the warmer into steam, the electrolysis of water is used for means for producing the hydrogen is used, with hydrogen occlusion alloy being used as means for partially storing the produced hydrogen, in accordance with the present invention.

Figure 19:
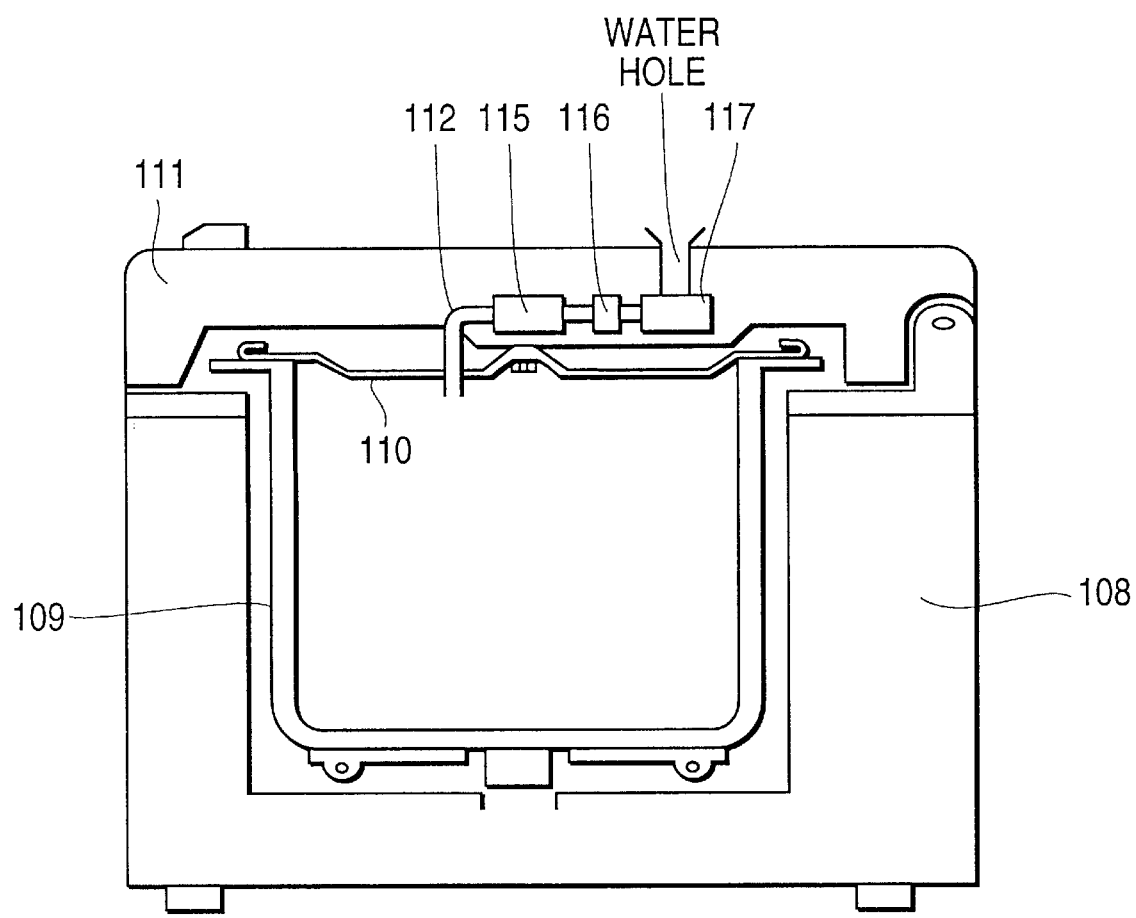
FIG. 19 shows a warmer provided with a means for reacting gas provided within the warmer, a means for producing hydrogen, and a means for storing hydrogen.

FIG. 19 shows the construction of the warmer in one example of the present invention. An inner pot 109 of volume 11 is provided in the outer container 108 and is closed with the internal cover 110. The internal cover is accompanied by the cover body 111 of the outer container, and is closed between the internal cover and the inner pot when the cover body is shut. An air intake pipe 112 is provided between the cover body and the internal cover and catalyst 115 including platinum is mounted with respect to the air intake pipe. A feed pipe for feeding hydrogen is provided in the catalyst and a hydrogen tank 116 for partially storing the hydrogen and the hydrogen producer 117 are provided ahead of the feed pipe.

In the present embodiment, catalyst (about 10 mg) including platinum carried in ceramic carrier and a little amount of rhodium, palladium is used as catalyst, a $LaNi_5$ material as alloy for storing part of hydrogen, also macro-molecular having sulfonic acid radical as electrolyte for effecting electrolysis, respectively. The releasing from the hydrogen alloy is effected by heating the tank. The hydrogen production effects DC constant current decomposition, making the condition a constant on operation. The hydrogen causing speed is controlled to 10 cc per minute.

The substitution of the inner oxygen into steam is effected with the use of the mock warmer. After the hydrogen has been caused sufficiently by electrolysis, the hydrogen occlusion alloy is heated and the hydrogen is introduced into the catalyst at a stretch. The oxygen becomes about 0 through about 1% with practically no oxygen according to the measurement of the inner oxygen concentration within 2 through 3 minutes. Also, the steam concentration is 50% or more.

As clear from the present embodiment, the means of the present invention is extremely effective in prevention of the deterioration in the cooked rice, because the inner oxygen can be reduced and substituted at a stretch. Of course, the means can be used repeatedly with the deterioration of the components being less.

In the present embodiment, any catalyst including platinum for reducing the oxygen will do although a little amount of rhodium, palladium contained in the catalyst is used as catalyst. It is needless to say that any amount and shape will do. Also, although $LaNi_5$ material is used as alloy for storing part of the hydrogen, it is needless to say that materials for occluding, releasing hydrogen, such as Pd, TiFe, Misch Metal, laves phase alloy or the like may be used. Any shape may be used. Although an example using macro-molecular film having sulfonic acid radical in the electrolyte of the hydrogen producer in the present embodiment, the oxide solid electrolyte may be used, and aqueous solution system electrolyte such as phosphoric acid, KOH or the like may be used.

(Embodiment 10)

The present embodiment shows an example about the warmer provided with a means for storing nitrogen, a means for introducing the nitrogen into the warmer, a means for producing the nitrogen. The present embodiment is an example where an oxygen pump using the solid electrolyte is used as a means for producing the nitrogen, and a mechanism where a tank having outer space of the internal pot within the warmer therein and the nitrogen is introduced into the internal pot by the cover closing are used as a means for introducing the nitrogen.

Figure 20:
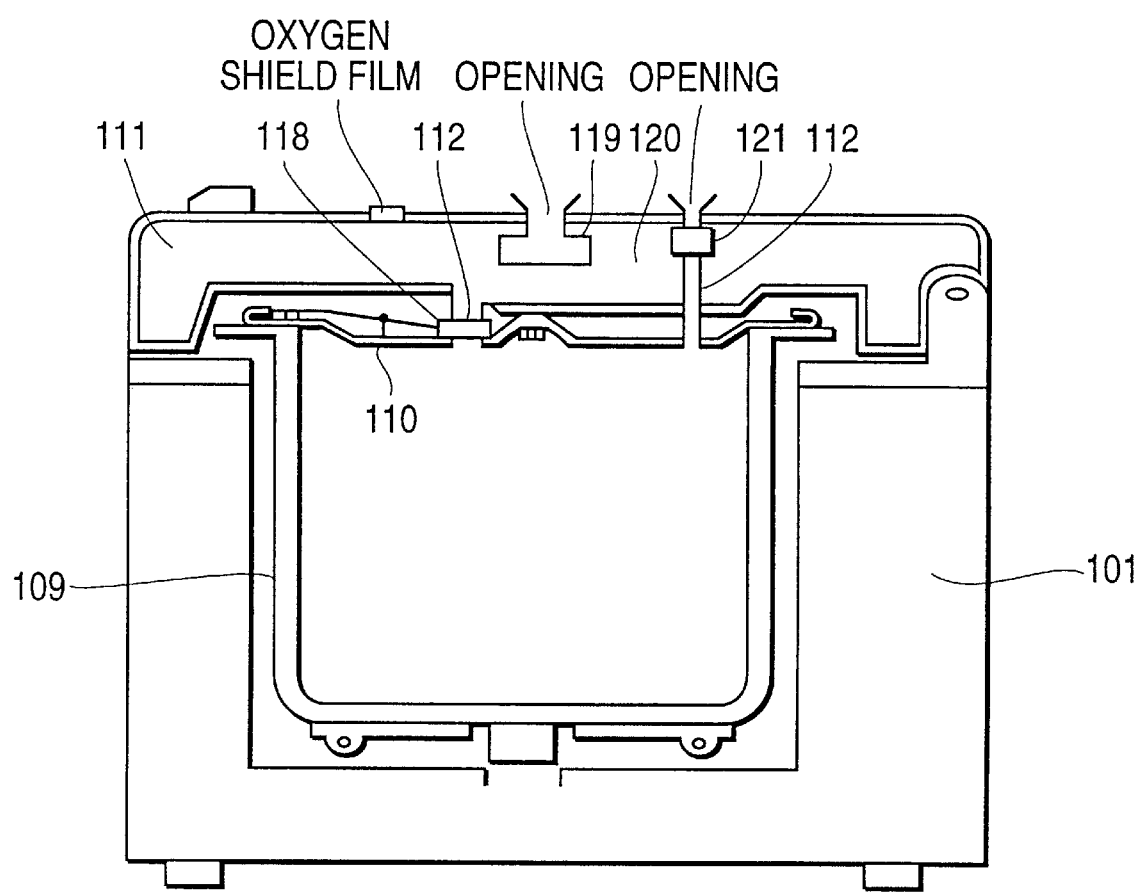
FIG. 20 shows a warmer provided with a means for storing hydrogen, a means for introducing the nitrogen into the warmer and a means for separating the nitrogen from air.

FIG. 20 shows the construction of a warmer as one example of the present invention. An inner pot 109 of volume 11 is provided in the outer container 108 and is closed by the internal cover 110. The internal cover of the present invention is composed of double construction. An open, close valve 118 mounted on the internal cover on further inner side is adapted to open when the cover body 111 of the outer container has been closed to introduce the nitrogen stored outside of the internal cover. The nitrogen separator 119 is adapted to remove the oxygen of the nitrogen tank 120 in the cover body to pump out the oxygen outside of the cover body by an oxygen pump composed of solid electrolyte $BaCe_{0.8}Gd_{0.2}O_{3-\alpha}$ manufactured. Also, a gap releasing valve 121 in the introduction of the nitrogen into the inner pot is provided. The nitrogen is adapted to be purged at the same time with the cover closing. The oxygen is removed continuously with the nitrogen producer being normally energized, and is adapted to be cut off in a certain period of time.

The air within the inner pot is substituted with the use of the mock warmer. Air (nitrogen) from which the oxygen is sufficiently removed by the electrolysis is filled into the tank and the cover is opened and closed. The interior air is released out of the warmer at a stretch. The oxygen is about 5 through 6% and is diluted according to the measured oxygen concentration of the interior at this time.

As clearly from the present invention, the interior air is reduced at a stretch or can be substituted by the means of the present invention, thus extremely effective in prevention of the boiled rice from being deteriorated. It is needless to say that the means can be used repeatedly without deterioration in the components.

Although the present embodiment shows an example of an oxygen pump where $BaCe_{0.8}Gd_{0.2}O_{3-\alpha}$ solid electrolyte is used for the nitrogen producer, zirconia origin oxide, bismuth origin oxide or cerium origin oxide may be used as the solid electrolyte. Or the tank for storing the nitrogen, placed within the warmer, in the present example may be settled anywhere outside of the cover.

As shown in the embodiments, the present invention can discharge the oxygen existing within the warmer, introduce the steam through the solid electrolytes by the use of the electric chemical pump, can remove the oxygen within the warmer in larger capacity, at higher efficiency and in a moment or lower the concentration by the gas pump construction of the flat plate built-up type, the cylindrical type, the honey-comb type or the like, thus preventing the cooked rice from being yellow in tint or causing unpleasant smells during the warmth keeping time.

POSSIBILITY OF INDUSTRIAL UTILIZATION

As clear from the above description, according to the gas pump of the present invention, at least the oxygen gas can be selectively discharged or fed from the first atmosphere into the second atmosphere. Therefore, the gas pump can be used in the wide range where atmosphere poor in oxygen or atmosphere rich in oxygen can be formed, atmosphere suitable for food preservation, atmosphere rich in oxygen can be retained indoors when the oxygen is likely to become poorer during the heating operation.

Also, the oxygen gas and the steam can be exchanged when necessary. The exchange ratio can be controlled by the controlling of the electrolytic voltage. The atmosphere is easier to control, because the transportation amount of the oxygen gas and the steam can be measured by the current amount.

We claim:

1. A gas-permselective gas pump comprising:
a planar molded body or bodies of first electrode/solid electrolyte/second electrode wherein the first and second electrodes are formed on both faces of a solid electrolyte layer;
a power source for applying a DC voltage between the first electrode and the second electrode; and
a heating means for heating the solid electrolyte layer to a given operating temperature, wherein the planar molded body is positioned between first and second atmospheres to be separated, with one of the first and second electrodes being provided on the cathode, and the other thereof on an anode, wherein the solid electrolyte is made of a perovskite type oxide including Ce having a mixed ion conductor for conducting protons and oxide ions, and wherein an oxygen gas in the first atmosphere which comes into contact at least on the cathode side is electrolytically reduced, by the DC voltage to be applied on both the electrodes from the power source to form oxide ions, the oxide ions are transmitted onto the anode side through the solid electrolyte layer with the potential difference between both the electrodes, the oxide ions transmitted are oxidized on the anode side to release the resultant oxygen gas into the second atmosphere.

2. The gas-permselective gas pump as claimed in claim 1, wherein a steam in the second atmosphere which comes into contact on the anode side is electrolycally reduced with the DC voltage to be applied on both the electrodes from the power source to form protons, the protons are transmitted onto the cathode side through the solid electrolyte layer by the potential difference between both the electrodes, and the transmitted protons are reacted with the oxygen on the cathode side to release the resultant stream into the first atmosphere.

3. The gas pump as claimed in claim 1, wherein the planar molded bodies are formed in layer shape on a support body having a gas transmission property, the first and second electrode layers are provided with a gas diffusion property not to prevent transmission of the oxide ions and the protons to be produced there through the solid electrolyte layer.

4. The gas pump as claimed in claim 1, wherein the planar molded body is formed by building-up of the first and second electrode layers on both the sides of the solid electrolyte molding body, the first and second electrode layers are provided with a gas diffusion property not to prevent transmission of the oxide ions and the protons to be produced there through the solid electrolyte layer.

5. The gas pump as claimed in claim 3, wherein the planar molded body has an electrolytic cell surrounding the first or second electrode so that the atmosphere gas including a component gas to be electrolysed can be taken in into the electrolyte layer.

6. A gas pump as claimed in claim 1, wherein the perovskite type oxide including Ce is an oxide represented by the formula: $BaCe_{1-x}M_xO_{3-\alpha}$, wherein M is a substitution element selected from a group composed of La, Pr, Nd, Pm, Sm, Eu, Gd, Tb, Dy, Ho, Er, Tm, Yb, Y.

7. A gas pump as claimed in claim 6, wherein the perovskite type oxide is an oxide represented by the formula: $BaCe_{1-x}M_xO_{3-\alpha}$, wherein M is as described above and X is within a range of 0.05 to 0.26.

8. A gas pump as claimed in claim 1, wherein the perovskite type oxide is an oxide represented by the formula: $BaCe_{1-x}M_xO_{3-\alpha}$ wherein M is Gd.

9. A gas pump as claimed in claim 1, wherein the thickness of the solid electrolyte is 1 mm or less.

10. The gas pump as claimed in claim 3, wherein the support body comprises a porous ceramics, a layer of the first electrode being formed by baking platinum paste layer applied on the ceramic support body, the solid electrolyte layer being formed by injecting the solid electrolyte in plasma solution on the electrode layer, further a layer of the second electrode being formed by baking platinum paste layer applied on the solid electrolyte layer.

11. The gas pump as claimed in claim 4, wherein the planar molded body is formed by baking platinum paste layers applied on both the sides of the solid electrolyte molding body to form layers of the first and second electrodes.

12. The gas pump as claimed in claim 5, wherein the planar molded body composed of first electrode layer/solid electrolyte layer/second electrolyte layer is provided with the electrolytic cell of the solid electrolyte layer by forming the first and second electrode layers on both the opposite faces.

13. The gas pump as claimed in claim 5, wherein the electrolytic cell is supported by a support body having a gas transmitting property, and the built-up body composed of the first electrode layer/solid electrolyte layer/second electrode layer is formed on one side thereof.

14. The gas pump as claimed in claim 12, wherein the electrolytic cell is composed of a honey-comb construction body or a pipe shaped body.

15. The gas pump as claimed in claim 1, wherein the constant current at the following steam decomposition voltage of 10 V or lower is applied to control oxygen transportation amount.

16. The gas pump as claimed in claim 1, wherein constant current at the steam decomposition voltage of 10 V or lower is applied to control steam transportation amount and an oxygen transportation amount.

17. The gas pump as claimed in claim 1, wherein constant voltage of 1.5 V or more is applied between the first and second electrodes at 300° C. in the solid electrolyte heating temperature for operation.

18. The gas pump as claimed in claim 1, wherein a heating means is adapted to cover the planar molded body with heaters through an insulating body, said heaters being covered by a material for preventing discharge of heat.

19. A cooked rice warmer comprising a cover capable of being opened and closed, a container for accommodating the cooked rice, a means for heating the container to keep the rice warm, and a gas-permselective gas pump claimed in claim 1.

20. The cooked rice warmer as claimed in claim 19, wherein the gas pump comprises solid electrolytes to close a plurality of holes of a substrate and a heater formed on a discharging side of the solid electrolyte.

21. The cooked rice warmer as claimed in claim 19, wherein the gas pump is an oxygen pump integrated with a solid electrolyte and a heating heater provided on the discharging side of the solid electrolyte and secured in construction to close a plurality of holes on a substrate.

22. The cooked rice warmer as claimed in claim 20, wherein the solid electrolyte is fixed on the substrate with inorganic bonding agent with $SiO_2$ as a major component to close the holes on the substrate.

23. The cooked rice warmer as claimed in claim 20, wherein the heater is covered with adiabatic materials, the material being selected from the group consisting of fire-proof adiabatic brick of high alumina quality, clay quality adiabatic brick, diatom earth quality adiabatic brick, calcium silicate, castable fire-proof material, quartz glass quality adiabatic material, ceramic fiber and carbon fiber.

24. A warmer comprising: a cover capable of being opened and closed, a container for accommodating the warmed, and a means for heating the container, wherein a means for removing gas existing in the warmer is provided, a means for introducing gas into the warmer from outside, the means for removing the gas and the means for introducing the gas being a gas pump described in claim 11.

25. The warmer as claimed in claim 24, wherein an oxygen existing within the warmer is removed and a steam is introduced into the warmer through the solid electrolyte by the gas pump.

26. The warmer as claimed in claim 24, comprising: a cover capable of being opened and closed, a container for accommodating the warmed, a means for heating the container, a gas pump for controlling gas existing within the warmer, wherein the gas pump is constructed of flat plate constructions.

27. The warmer as claimed in claim 26, wherein the gas pump having flat plate construction is made of a pair of platinum electrodes and solid electrolyte.

28. The warmer as claimed in claim 27, wherein the thickness of the solid electrolyte is 1 mm or less.

29. The warmer as claimed in claim 26, wherein the gas pump of flat plate construction are built up.

30. The warmer as claimed in claim 24, comprising: a cover capable of being opened and closed, a container for accommodating the warmed, a means for heating the container, and an electrochemical gas pump for controlling gas existing within the warmer,
wherein the gas pump is of cylindrical pipe construction.

31. The warmer as claimed in claim 30, wherein the gas pump having cylindrical pipe construction is of a pair of platinum electrodes and solid electrolyte.

32. The warmer as claimed in claim 31, wherein the thickness of the solid electrolyte is 1 mm or less.

33. The warmer as claimed in claim 24, comprising: a cover capable of being opened and closed, a container for accommodating the warmed, a means for heating the container, an electrochemical gas pump for controlling gas existing within the warmer, wherein the gas pump is of cylindrical pipe construction with its one end being closed.

34. The warmer as claimed in claim 33, wherein the gas pump having cylindrical pipe construction with its one end being closed is composed of a pair of platinum electrodes and solid electrolyte.

35. The warmer described in accordance with claim 34 wherein the thickness of the solid electrolyte is 1 mm or less.

36. The warmer as claimed in claim 24, comprising: a cover capable of being opened and closed, a container for accommodating the warmed, a means for heating the container, an electrochemical gas pump for controlling gas existing within the warmer, wherein the gas pump is of honey-comb construction.

37. The warmer as claimed in claim 36, wherein the gas pump having honey-comb construction is of a pair of platinum electrodes and solid electrolyte.

38. A warmer, comprising: a cover capable of being opened and closed, a container for accommodating the warmed, a means for heating the container to keep the warmed warm, wherein a means for reacting gas provided within the warmer is further provided.

39. The warmer as claimed in claim 28, wherein the oxygen existing within the warmer is substituted into steam by the means for reacting gas.

40. The warmer as claimed in claim 39, wherein the means for reacting gas is a catalyst including platinum which substitutes the oxygen within the warmer into steam.

41. The warmer as claimed in claim 38, wherein a reduction gas is introduced into the warmer.

42. A warmer comprising: a cover capable of being opened and closed, a container for accommodating the warmed, a means for heating the container to keep the warmed warm, wherein means for producing hydrogen, hydrocarbon, alcohols are further provided.

43. The warmer as claimed in claim 42, wherein water is electrically decomposed by the means for producing hydrogen.

44. A warmer comprising: a cover capable of being opened and closed, a container for accommodating the warmed, a means for heating the container wherein a means for storing hydrogen is further provided.

45. A warmer as claimed in claim 44, wherein hydrogen storing metal or hydrogen storing alloy is used for the means for storing hydrogen.

46. A warmer comprising: a cover capable of being opened and closed, a container for accommodating the warmed, a means for heating the container wherein a means for storing nitrogen, and a means for introducing the nitrogen into the warmer are further provided.

47. A warmer comprising: a cover capable of being opened and closed, a container for accommodating the warmed, a means for heating the container wherein a means for separating the nitrogen from air is further provided.

48. The warmer as claimed in claim 47, wherein oxygen is removed from air through electrolyte by the means for separating the nitrogen from air.

49. The cooker as claimed in claim 48, wherein the electrolyte is made of an oxide material.

50. The cooker as claimed in claim 49, wherein the oxide material of a perovskite type construction.

51. The cooker as claimed in claim 50, wherein the oxide material contains Ce and Ba elements.

52. The cooker as claimed in claim 51, wherein the oxide material is an oxide represented by the formula: $BaCe_{1-x}M_xO_{3-\alpha}$ wherein $0<x<1$, $\alpha<1.5$, M is a third adding element or substituting element.

53. The gas pump as claimed in claim 4, wherein the planar molded body has an electrolytic cell surrounding the first or second electrode so that the atmosphere gas including a component gas to be electrolysed can be taken in into the electrolyte layer.

54. A gas pump as claimed in claim 1, wherein the perovskite type oxide including Ce is an oxide represented by the formula: $BaCe_{1-x}M_xO_{3-\alpha}$, wherein M is a substitution element selected from a group composed of La, Pr, Nd, Pm, Sm, Eu, Gd, Tb, Dy, Ho, Er, Tm, Yb, Y.

55. The gas pump as claimed in claim 13, wherein the electrolytic cell is composed of a honey-comb construction body or a pipe shaped body.

56. The cooked rice warmer as claimed in claim 21, wherein the solid electrolyte is fixed on the substrate with inorganic bonding agent with $SiO_2$ as a major component to close the holes on the substrate.

* * * * *